(12) United States Patent
Gamache et al.

(10) Patent No.: US 6,401,120 B1
(45) Date of Patent: Jun. 4, 2002

(54) METHOD AND SYSTEM FOR CONSISTENT CLUSTER OPERATIONAL DATA IN A SERVER CLUSTER USING A QUORUM OF REPLICAS

(75) Inventors: Rod Gamache, Issaquah; Michael T. Massa, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/277,450

(22) Filed: Mar. 26, 1999

(51) Int. Cl.$^7$ ............................................. G06F 15/173
(52) U.S. Cl. ........................ 709/226; 709/220; 709/223
(58) Field of Search ........................... 707/10, 202, 204; 709/219, 214, 217, 218, 226, 220, 223

(56) References Cited

U.S. PATENT DOCUMENTS

| | | |
|---|---|---|
| 5,280,627 A | 1/1994 | Flaherty et al. |
| 5,553,239 A | 9/1996 | Heath et al. |
| 5,659,748 A | 8/1997 | Kennedy |
| 5,673,384 A | 9/1997 | Hepner et al. |
| 5,727,206 A | 3/1998 | Fish et al. |
| 5,754,821 A | 5/1998 | Cripe et al. |
| 5,781,910 A | 7/1998 | Gostanian et al. |
| 5,828,876 A | 10/1998 | Fish et al. |
| 5,828,889 A | 10/1998 | Moiin et al. |
| 5,892,913 A * | 4/1999 | Adiga et al. ................. 709/219 |
| 5,893,086 A | 4/1999 | Schmuck et al. |
| 5,909,540 A | 6/1999 | Carter et al. |
| 5,917,998 A | 6/1999 | Cabrera et al. |
| 5,918,229 A * | 6/1999 | Davis et al. .................... 707/10 |
| 5,940,838 A | 8/1999 | Schmuck et al. |
| 5,946,686 A | 8/1999 | Schmuck et al. |
| 5,948,109 A | 9/1999 | Moiin et al. |
| 5,996,075 A | 11/1999 | Matena |
| 5,999,712 A | 12/1999 | Moiin et al. |
| 6,014,669 A * | 1/2000 | Slaughter et al. ............. 707/10 |

FOREIGN PATENT DOCUMENTS

| | | |
|---|---|---|
| EP | 0 760 503 | 3/1997 |
| EP | 0 887 731 | 12/1998 |

OTHER PUBLICATIONS

Bernstein et al., "Replicated Data", *Concurrency Control and Recovery in Database Systems*, Chapter 8, Addison–Wesley Publishing Company, pp. 265–311 (1987).

Oki et al., "Viewstamped Replication: A New Primary Copy Method of Support Highly–Available Distributed Systems", *Proceedings of the 7$^{th}$ ACM Symposium on Principles of Distributed Computing*, pp. 8–17 (1988).

Carr, Richard, "The Tandom Global Update Protocol," *Tandem Systems Review*, vol. 1, No. 2, pp. 74–85 (Jun. 1995).

Gifford, David K., "Weighted Voting for Replicated Data," pp. 150–159 (1979).

Lamport, Leslie, *A Fast Mutual Exclusion Algorithm*, Digital Equipment Corporation (Nov. 14, 1985).

Lamport, Leslie, *The Part–Time Parliament*, Digital Equipment Corporation (Sep. 1, 1989).

* cited by examiner

Primary Examiner—Le Hien Luu
(74) Attorney, Agent, or Firm—Michalik & Wylie, PLLC

(57) ABSTRACT

A method and system for increasing the availability of a server cluster while reducing its cost by requiring at a minimum only one node and a quorum replica set of storage devices (replica members) to form and continue operating as a cluster. A plurality of replica members maintain the cluster operational data and are independent from any given node. A cluster may be formed and continue to operate as long as one server node possesses a quorum (majority) of the replica members. This ensures that a new or surviving cluster has a least one replica member that belonged to the immediately prior cluster and is thus correct with respect to the cluster operational data. Update sequence numbers and/or timestamps are used to determine the most updated replica member from among those in the quorum for reconciling the other replica members.

49 Claims, 15 Drawing Sheets

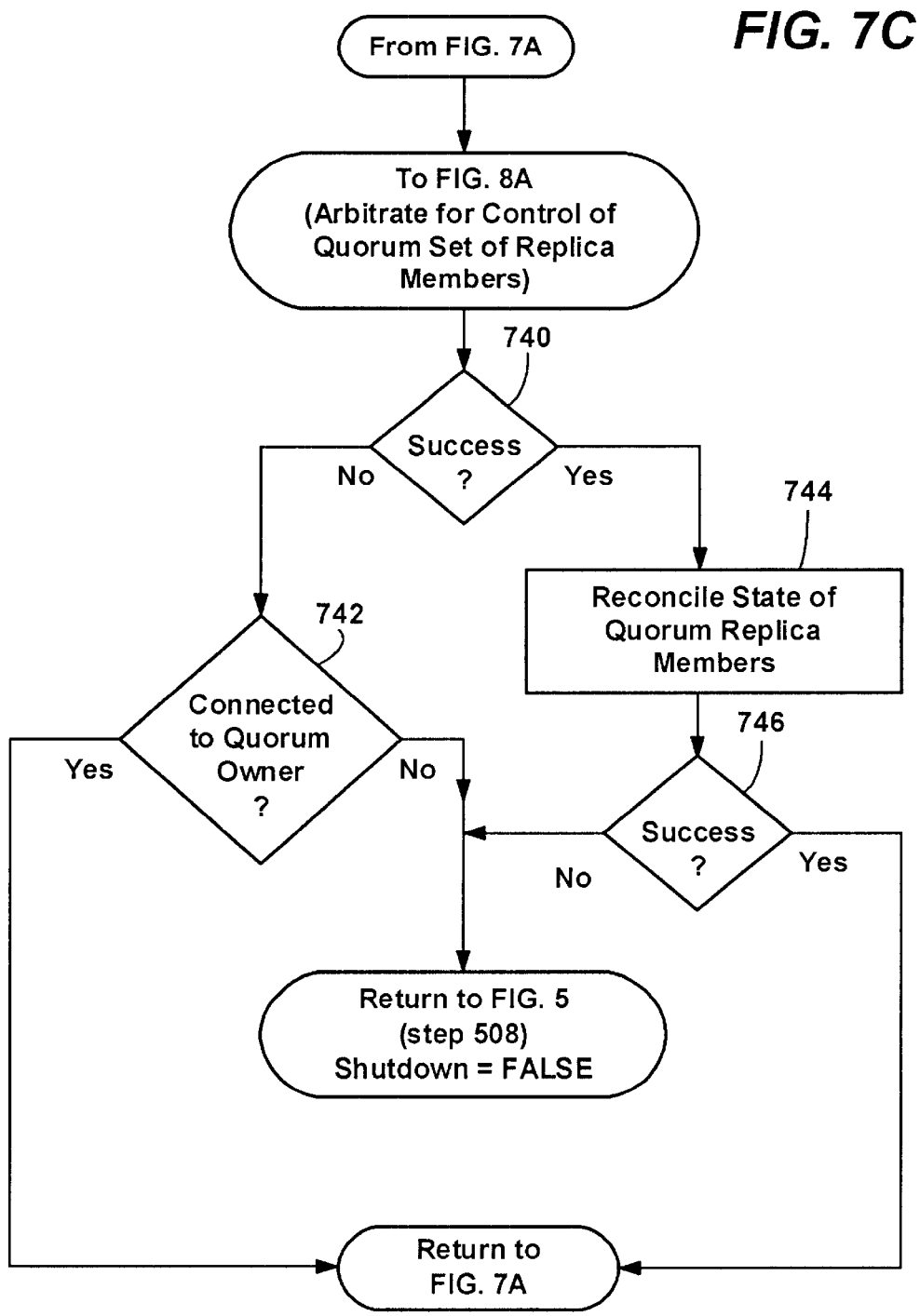

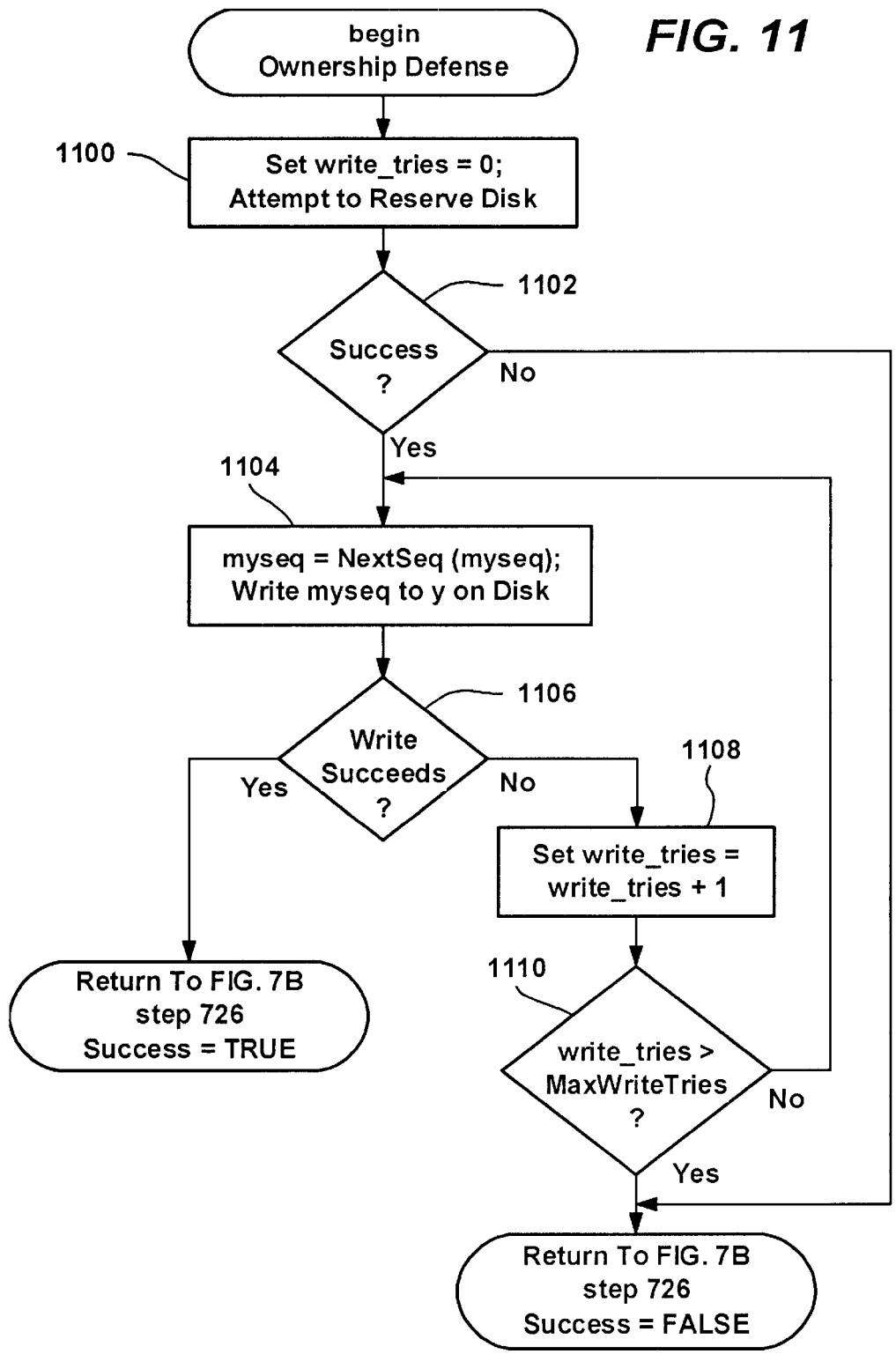

METHOD AND SYSTEM FOR CONSISTENT CLUSTER OPERATIONAL DATA IN A SERVER CLUSTER USING A QUORUM OF REPLICAS

FIELD OF THE INVENTION

The invention relates generally to computer network servers, and more particularly to computer servers arranged in a server cluster.

BACKGROUND OF THE INVENTION

A server cluster ordinarily is a group of at least two independent servers connected by a network and utilized as a single system. The clustering of servers provides a number of benefits over independent servers. One important benefit is that cluster software, which is run on each of the servers in a cluster, automatically detects application failures or the failure of another server in the cluster. Upon detection of such failures, failed applications and the like can be terminated and restarted on a surviving server.

Other benefits of clusters include the ability for administrators to inspect the status of cluster resources, and accordingly balance workloads among different servers in the cluster to improve performance. Such manageability also provides administrators with the ability to update one server in a cluster without taking important data and applications offline for the duration of the maintenance activity. As can be appreciated, server clusters are used in critical database management, file and intranet data sharing, messaging, general business applications and the like.

When operating a server cluster, the cluster operational data (i.e., state) of any prior incarnation of a cluster needs to be known to the subsequent incarnation of a cluster, otherwise critical data may be lost. For example, if a bank's financial transaction data are recorded in one cluster, but a new cluster starts up without the previous cluster's operational data, the financial transactions may be lost. To avoid this, prior clustering technology required that each node (server) of a cluster possess its own replica of the cluster operational data on a private storage thereof, and that a majority of possible nodes (along with their private storage device) of a cluster be operational in order to start and maintain a cluster. This ensured that at least one node in any given set of nodes in a cluster was common to any previous cluster and thus the cluster had at least one copy of the correct cluster operational data. Further, the majority (quorum) requirement ensures that only one incarnation of the cluster exists at any point in time, e.g., two non-communicating subsets of the cluster membership cannot form two different instances of the cluster at the same time.

However, requiring a quorum of nodes has the drawback that a majority of the possible nodes of a cluster have to be operational in order to have a cluster. A recent improvement described in U.S. patent application Ser. No. 08/963,050, entitled "Method and System for Quorum Resource Arbitration in a Server Cluster," assigned to the same assignee and hereby incorporated by reference herein in its entirety, provides the cluster operational data on a single quorum device, typically a storage device, for which cluster nodes arbitrate for exclusive ownership. Because the correct cluster operational data is on the quorum device, a cluster may be formed as long as a node of that cluster has ownership of the quorum device. Also, this ensures that only one unique incarnation of a cluster can exist at any given time, since only one node can exclusively own the quorum device. The single quorum device solution increases cluster availability, since at a minimum, only one node and the quorum device are needed to have an operational cluster. While this is a significant improvement over requiring a majority of nodes to have a cluster, a single quorum device is inherently not reliable, and thus to increase cluster availability, expensive hardware-based solutions are presently employed to provide highly-reliable single quorum device for storage of the operational data. The cost of the highly-reliable storage device is a major portion of the cluster expense.

SUMMARY OF THE INVENTION

Briefly, the present invention provides a method and system wherein at least three storage devices (replica members) are available to maintain the cluster operational data, and wherein the replica members are independent from any given node. A cluster may operate as long as one node possesses a quorum (e.g., a simple majority) of the replica members. This ensures that only one unique incarnation of a cluster can exist at any given time, since only one node may possess a quorum of members. The quorum requirement further ensures that a new or surviving cluster has at least one replica member that belonged to the immediately prior cluster and is thus correct with respect to the cluster operational data. Update sequence numbers and/or timestamps are used to determine the most up-to-date replica member from among those in the quorum. The method and system of the present invention require only a small number of relatively inexpensive components to form a cluster, thereby increasing availability relative to the quorum of nodes solution, while lowering cost relative to the single quorum device solution.

Other benefits and advantages will become apparent from the following detailed description when taken in conjunction with the drawings, in which:

BRIEF DESCRIPTION OF THE DRAWINGS

FIGS. 7A–7C comprise a flow diagram representing the steps taken by a node when operating in a cluster in accordance with one aspect of the present invention;

FIG. 11 is a flow diagram representing steps taken by a node representing the cluster to defend its ownership of a replica member.

DETAILED DESCRIPTION OF THE PREFERRED EMBODIMENT

EXEMPLARY OPERATING ENVIRONMENT

Figure 1:
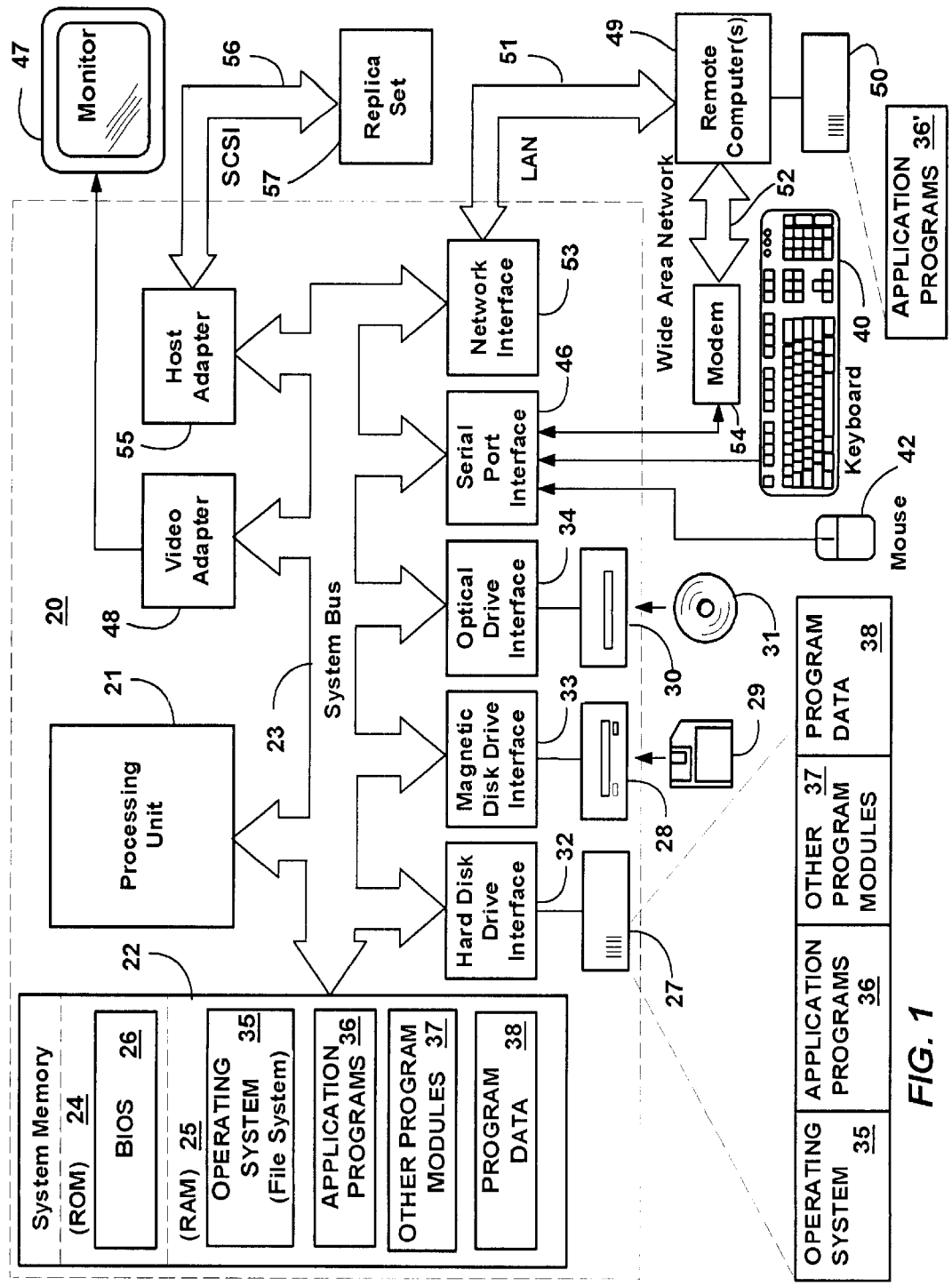
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like acting as a node (i.e., system) in a clustering environment. The computer 20 includes a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (which may be considered as including or operatively connected to a file system), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 operates in a networked environment using logical connections to one or more remote computers 49. At least one such remote computer 49 is another system of a cluster communicating with the personal computer system 20 over the networked connection. Other remote computers 49 may be another personal computer such as a client computer, a server, a router, a network PC, a peer device or other common network system, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. The computer system 20 may also be connected to system area networks (SANS, not shown). Other mechanisms suitable for connecting computers to form a cluster include direct connections such as over a serial or parallel cable, as well as wireless connections. When used in a LAN networking environment, as is typical for connecting systems of a cluster, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 3A:
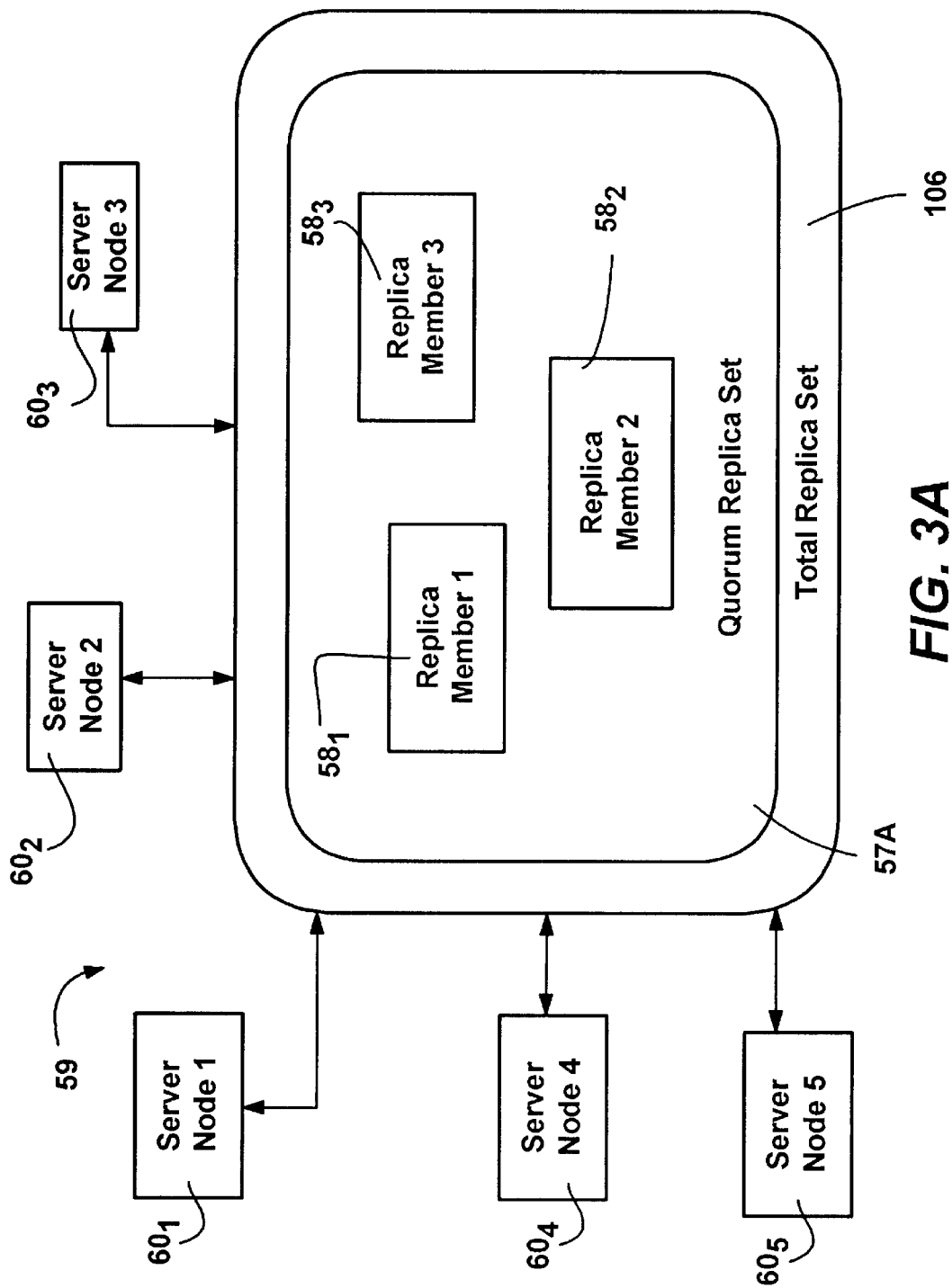
FIGS. 3A and 3B are block diagrams representing a server cluster having a plurality of replica members therein for storing cluster operational data in accordance with one aspect of the present invention wherein various cluster components fail over time.

The preferred system 20 further includes a host adapter 55 or the like which connects the system bus 23 to a SCSI (Small Computer Systems Interface) bus 56 for communicating with a quorum replica set 57 (FIG. 3A) comprising one or more independent, shared persistent memory storage devices, referred to herein as replica members (e.g., $58_1$–$58_3$ of FIG. 3A). Other ways of connecting cluster systems to storage devices, including Fibre Channel, are equivalent. Indeed, one alternative way to connect storage devices is via a network connection, as described in U.S. patent application Ser. No. 09/260,194 entitled "Method and System for Remote Access of Computer Devices," assigned to the assignee of the present invention and hereby incorporated by reference in its entirety.

As used herein, a "replica member" is a storage device that is not private to any specific node, but rather is able to be utilized by any node of the cluster at various times. In other words, a replica member can operate in a cluster regardless of which node or nodes are in that particular incarnation thereof. Each replica member may be a simple disk, or some or all of them may be a hardware-based redundant array of devices, although as will become apparent, a benefit of the present invention is that such hardware-based redundancy is unnecessary. Note that any number of replica members (i.e., greater than two in the present invention) may be available in a given cluster configuration, however for purposes of simplicity only three are shown in FIG. 3A. In any event, as shown in FIG. 3A, the computer system 20 (FIG. 1) may comprise the node $60_1$ of a cluster 59, while one of the remote computers 49 (FIG. 1) may be similarly connected to the SCSI bus 56 and comprise the node $60_2$, and so on.

CLUSTER SERVICE COMPONENTS

Figure 2:
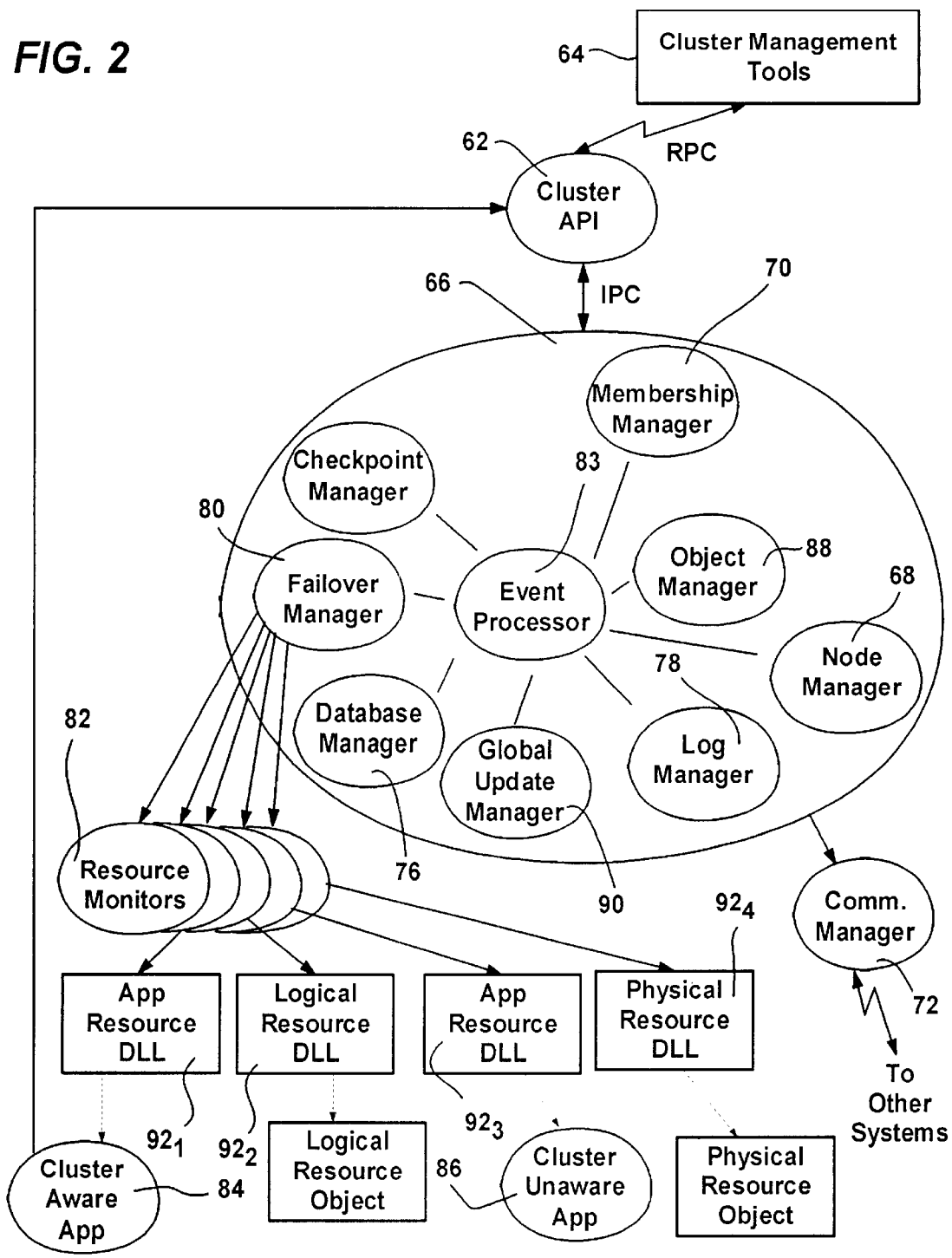
FIG. 2 is a representation of various components within the clustering service of a machine.

FIG. 2 provides a representation of cluster service components and their general relationships in each of the nodes $60_1$–$60_n$ (FIG. 3A) of a cluster 59. As shown in FIG. 2, to accomplish cluster creation and to perform other administration of cluster resources, nodes, and the cluster itself, a cluster application programming interface (API) 62 is provided. Applications and cluster management administration tools 64 call various interfaces in the API 62 using remote procedure invocations through RPC (Remote Procedure Calls) or DCOM (Distributed Component Object Model), whether running in the cluster or on an external system. The various interfaces of the API 62 may be considered as being categorized by their association with a particular cluster component, i.e., nodes, resources and the cluster itself.

An administrator typically works with groups, each group being a collection of resources (e.g., cluster application resources, names, addresses and so forth) organized to allow an administrator to combine resources into larger logical units and manage them as a unit. Group operations performed on a group affect all resources contained within that group. Usually a group contains all of the elements needed to run a specific application, and for client systems to connect to the service provided by the application. For example, a group may include an application that depends on a network name, which in turn depends on an Internet Protocol (IP) address, all of which are collected in a single group. In a preferred arrangement, the dependencies of all resources in the group are maintained in a directed acyclic graph, known as a dependency tree. Dependency trees are described in more detail in U.S. patent application Ser. No. 08/963,049 entitled "Method and System for Resource Monitoring of Disparate Resources in a Server Cluster," assigned to the same assignee as the present invention and hereby incorporated by reference herein in its entirety.

A cluster service 66 controls the cluster operation on a server cluster 59 (e.g., FIG. 3A), and is preferably implemented as a Windows NT® service. The cluster service 66 includes a node manager 68, which manages node configuration information and network configuration information (e.g., the paths between nodes $60_1$–$60_n$) The node manager 68 operates in conjunction with a membership manager 70, which runs the protocols that determine what cluster membership is when a change (e.g., regroup) occurs. A communications manager 72 (kernel driver) manages communications with other nodes of the cluster 59 via one or more network paths. The communications manager 72 sends periodic messages, called heartbeats, to counterpart components on the other nodes of the cluster 59 to provide a mechanism for detecting that the communications path is good and that the other nodes are operational. Through the communications manager 72, the cluster service 66 is essentially in constant communication with the other nodes $60_1$–$60_n$ of the cluster 59. In a small cluster, communication is fully connected, i.e., all nodes of the cluster 59 are in direct communication with all other nodes. In a large cluster, direct communication may not be possible or desirable for performance reasons.

Nodes $60_1$–$60_n$ in the cluster 59 have the same view of cluster membership, and in the event that one node detects a communication failure with another node, the detecting node broadcasts a message to nodes of the cluster 59 causing other members to verify their view of the current cluster membership. This is known as a regroup event, during which writes to potentially shared devices are disabled until the membership has stabilized. If a node does not respond, it is removed from the cluster 59 and its active groups are failed over ("pulled") to one or more active nodes. Note that the failure of the cluster service 66 also causes its locally managed resources to fail.

The cluster service 66 also includes a configuration database manager 76 which implements the functions that maintain a cluster configuration database on local storage devices $98_1$–$98_n$ (FIG. 4) such as a disk and/or memory, and configuration databases $100_1$–$100_3$ (FIG. 4) on each of the replica members $58_1$–$58_3$. The databases $100_1$–$100_3$ maintain cluster operational data, i.e., information about the physical and logical entities in the cluster 59, as described below. In one embodiment, the cluster operational data may be split into core boot data and cluster configuration data, and is maintained in two cluster databases, as described in the copending U.S. Patent application entitled "Data Distribution in a Server Cluster," assigned to the same assignee as the present invention, filed concurrently herewith, and incorporated by reference herein. As described therein, the core-boot data is stored in a database maintained on quorum replica members, while the cluster configuration data is stored in a database on a higher performance/lower cost storage mechanism such as a mirror set of storage elements. Note that the cluster software is aware that the core boot data is replicated to multiple storage devices, and that the core boot data has a log per storage device as described below. However, in such an embodiment, the cluster software views the mirror set storage as a single storage device and is generally not cognizant of the replication (which is maintained at a lower level). Thus, the cluster configuration information is viewed by the cluster software as a single database with a single log. Further, note that both persistent and volatile information may be used to track the current and desired state of the cluster 59, e.g., a copy of one or both of the databases may also reside on each node. The database manager 76 may cooperate with counterpart database managers of nodes in the cluster 59 to maintain certain cluster information consistently across the cluster 59. Global updates may be used to ensure the consistency of the cluster database in each of the replica members $58_1$–$58_3$ and nodes $60_1$–$60_n$.

A logging manager 78 provides a facility that works with the database manager 76 of the cluster service 66 to maintain cluster state information across a situation in which a cluster shuts down and a new cluster is later formed with no nodes necessarily being common to the previous cluster, known as a temporal partition. The logging manager 78 operates with the log file, preferably maintained in the replica members $58_1$–$58_3$, to unroll logged state changes when forming a new cluster following a temporal partition.

A failover manager 80 makes resource/group management decisions and initiates appropriate actions, such as startup, restart and failover. The failover manager 80 is responsible for stopping and starting the node's resources, managing resource dependencies, and for initiating failover of groups.

The failover manager 80 receives resource and node state information from at least one resource monitor 82 and the node manager 68, for example, to make decisions about groups. The failover manager 80 is responsible for deciding which nodes in the cluster 59 should "own" which groups. Those nodes that own individual groups turn control of the resources within the group over to their respective failover managers 80.

An event processor 83 connects the components of the cluster service 66 via an event notification mechanism. The event processor 83 propagates events to and from cluster-aware applications (e.g., 84) and to and from the components within the cluster service 66. An object manager 88 maintains various cluster objects. A global update manager 90 operates to provide a global, atomic and consistent update service that is used by other components within the cluster service 66. The global update protocol (GLUP) is used by the global update manager 90 to broadcast updates to each node $60_1$–$60_n$ in the cluster 59. GLUP generally comprises a standard global update message format, state information maintained in each node, and a set of rules that specify how global update should be processed and what steps should be taken when failures occur.

In general, according to the GLUP protocol, one node (e.g. $60_1$ of FIG. 4) serves as a "locker" node. The locker node $60_1$ ensures that only one global update is in progress at any given time. With GLUP, a node (e.g., $60_2$) wishing to send an update to other nodes first sends a request to the locker node $60_1$. When any preceding updates are complete, the locker node $60_1$ gives permission for this "sender" node $60_2$ to broadcast its update to the other nodes in the cluster 59. In accordance with GLUP, the sender node $60_2$ sends the updates, one at a time, to the other nodes in a predetermined GLUP order that is ordinarily based on a unique number assigned to each node. GLUP can be utilized to replicate data to the machines of a cluster 59, including at least some of the cluster operational data, as described below. A more detailed discussion of the GLUP protocol is described in the publication entitled "Tandem Systems Review" Volume 1, Number 2, June, 1985 pp. 74–84, which is incorporated by reference herein.

A resource monitor 82 runs in one or more processes that may be part of the cluster service 66, but are shown herein as being separate from the cluster service 66 and communicating therewith via RPC or the like. The resource monitor 82 monitors the health of one or more resources (e.g., $92_1$–$92_4$) via callbacks thereto. The monitoring and general operation of resources is described in more detail in the aforementioned U.S. patent application Ser. No. 08/963,049.

The resources (e.g., $92_1$–$92_4$) are implemented as one or more Dynamically Linked Libraries (DLLs) loaded into the address space of the Resource Monitor 82. For example, resource DLLs may include physical disk, logical volume (consisting of one or more physical disks), file and print shares, network addresses and names, generic service or application, and Internet Server service DLLs. Certain resources (e.g., provided by a single source) may be run in a single process, while other resources may be run in at least one other process. The resources $92_1$–$92_4$ run in the system account and are considered privileged code. Resources $92_1$–$92_4$ may be defined to run in separate processes, created by the cluster service 66 when creating resources.

Resources expose interfaces and properties to the cluster service 66, and may depend on other resources, with no circular dependencies allowed. If a resource does depend on other resources, the resource is brought online after the resources on which it depends are already online, and is taken offline before those resources. Moreover, each resource has an associated list of nodes in the cluster 59 on which this resource may execute. For example, a disk resource may only be hosted on nodes that are physically connected to the disk. Also associated with each resource is a local restart policy, defining the desired action in the event that the resource cannot continue on the current node.

Nodes $60_1$–$60_n$ in the cluster 59 need to maintain a consistent view of time. One of the nodes, known as the time source and selected by the administrator, includes a resource that implements the time service. Note that the time service, which maintains consistent time within the cluster 59, is implemented as a resource rather than as part of the cluster service 66 itself.

From the point of view of other nodes in the cluster 59 and management interfaces, nodes in the cluster 59 may be in one of three distinct states, offline, online or paused. These states are visible to other nodes in the cluster 59, and thus may be considered the state of the cluster service 66. When offline, a node is not a fully active member of the cluster 59. The node and its cluster service 66 may or may not be running. When online, a node is a fully active member of the cluster 59, and honors cluster database updates, maintains heartbeats, and can own and run groups. Lastly, a paused node is a fully active member of the cluster 59, and thus honors cluster database updates and maintains heartbeats. Online and paused are treated as equivalent states by most of the cluster software, however, a node that is in the paused state cannot honor requests to take ownership of groups. The paused state is provided to allow certain maintenance to be performed.

Note that after initialization is complete, the external state of the node is offline. To join a cluster 59, following the restart of a node, the cluster service 66 is started automatically. The node configures and mounts local, non-shared devices. Cluster-wide devices are left offline while booting, because they may be in use by another node. The node tries to communicate over the network with the last known members of the cluster 59. When the node discovers any member of the cluster 59, it performs an authentication sequence wherein the existing cluster node authenticates the newcomer and returns a status of success if authenticated, or fails the request if not. For example, if a node is not recognized as a member or its credentials are invalid, then the request to join the cluster 59 is refused. If successful, the newcomer may be sent an updated copy of the shared database or databases. The joining node may use the one or more databases to find shared resources and to bring them online as needed, and also to find other cluster members. If a cluster is not found during the discovery process, a node will attempt to form its own cluster, by acquiring control of a quorum of the replica devices in accordance with one aspect of the present invention, as described below.

Once online, a node can have groups thereon. A group can be "owned" by only one node at a time, and the individual resources within a group are present on the node that currently owns the group. As a result, at any given instant, different resources within the same group cannot be owned by different nodes across the cluster 59. Groups can be failed over or moved from one node to another as atomic units. Each group has a cluster-wide policy associated therewith comprising an ordered list of owners. A group fails over to nodes in the listed order.

For example, if a resource (e.g., an application) fails, the failover manager 80 may choose to restart the resource, or to take the resource offline along with any resources dependent thereon. If the failover manager 80 takes the resource offline, the group is restarted on another node in the cluster 59, known as pushing the group to another node. A cluster administrator may also manually initiate such a group transfer. Both situations are similar, except that resources are gracefully shutdown for a manually initiated failover, while they are forcefully shut down in the failure case.

When an entire node in the cluster 59 fails, its groups are pulled from the failed node to another node. This process is similar to pushing a group, but without the shutdown phase on the failed node. To determine what groups were running on the failed node, the nodes maintain group information on each node of the cluster 59 in a database to track which nodes own which groups. To determine which node should take ownership of which groups, those nodes capable of hosting the groups negotiate among themselves for ownership, based on node capabilities, current load, application feedback and/or the group's node preference list. Once negotiation of a group is complete, all members of the cluster 59 update their databases to properly reflect which nodes own which groups.

When a previously failed node comes back online, the failover manager 80 decides whether to move some groups back to that node, in an action referred to as failback. To automatically failback, groups require a defined preferred owner. There may be an ordered list of preferred owners in a cluster of more than two nodes. Groups for which the newly online node is the preferred owner are pushed from the current owner to the new node. Protection, in the form of a timing window, is included to control when the failback occurs.

CONSISTENT CLUSTER OPERATIONAL DATA USING QUORUM OF REPLICAS

In accordance with one aspect of the present invention, the information needed to form and operate a cluster, i.e., the cluster operational data, is replicated to a quorum replica set 57 of the replica members (e.g., $58_1$–$58_3$ of FIG. 3A). Such information generally includes node information, information regarding the replica members $58_1$–$58_3$ of the quorum replica set 57, and other critical information. A node of the cluster (e.g., $60_1$) must obtain exclusive ownership (control) of a quorum replica set 57 of replica members in order to form and maintain a cluster. Control of a quorum replica set establishes a cluster and guarantees that the cluster incarnation is unique, because only one node can have control over the quorum replica set 57 at any one time. Updates to this operational data are replicated to each member of the quorum replica set 57 by the node that has exclusive ownership thereof. Note that if another node wants to access some information in the quorum replica set 57, it does so through the node that owns the replica set, such as by communicating with that node via the GLUP protocol.

To create a new cluster, a system administrator runs a cluster installation utility on a system (node) that then becomes a first member of the cluster 59. For a new cluster 59, a total replica set 106 of replica members is created, each member including a database (e.g., $100_1$, FIG. 4) having an identical copy of the initial cluster operational data added thereto. The administrator then configures any resources that are to be managed by the cluster software, possibly including other storage devices. In general, a first system forms a cluster as generally described below with reference to FIG. 6. At this time, a cluster exists having a single node (e.g., $60_1$), after which an installation procedure may be run to add more nodes and resources. Each added node (e.g., $60_2$) receives at least a partial copy of the current cluster operational data, (e.g., the cluster database $100_1$). This copy includes the information necessary to identify and access the members of the total replica set 106 and the identity of the other known member nodes of the cluster, (e.g., $60_1$–$60_n$). This information is contained on the added node's local storage, (e.g., $98_2$). Once added, the additional nodes may join the cluster created by the first node, or if unsuccessful, may attempt to form a new instance of the cluster.

Figure 5:
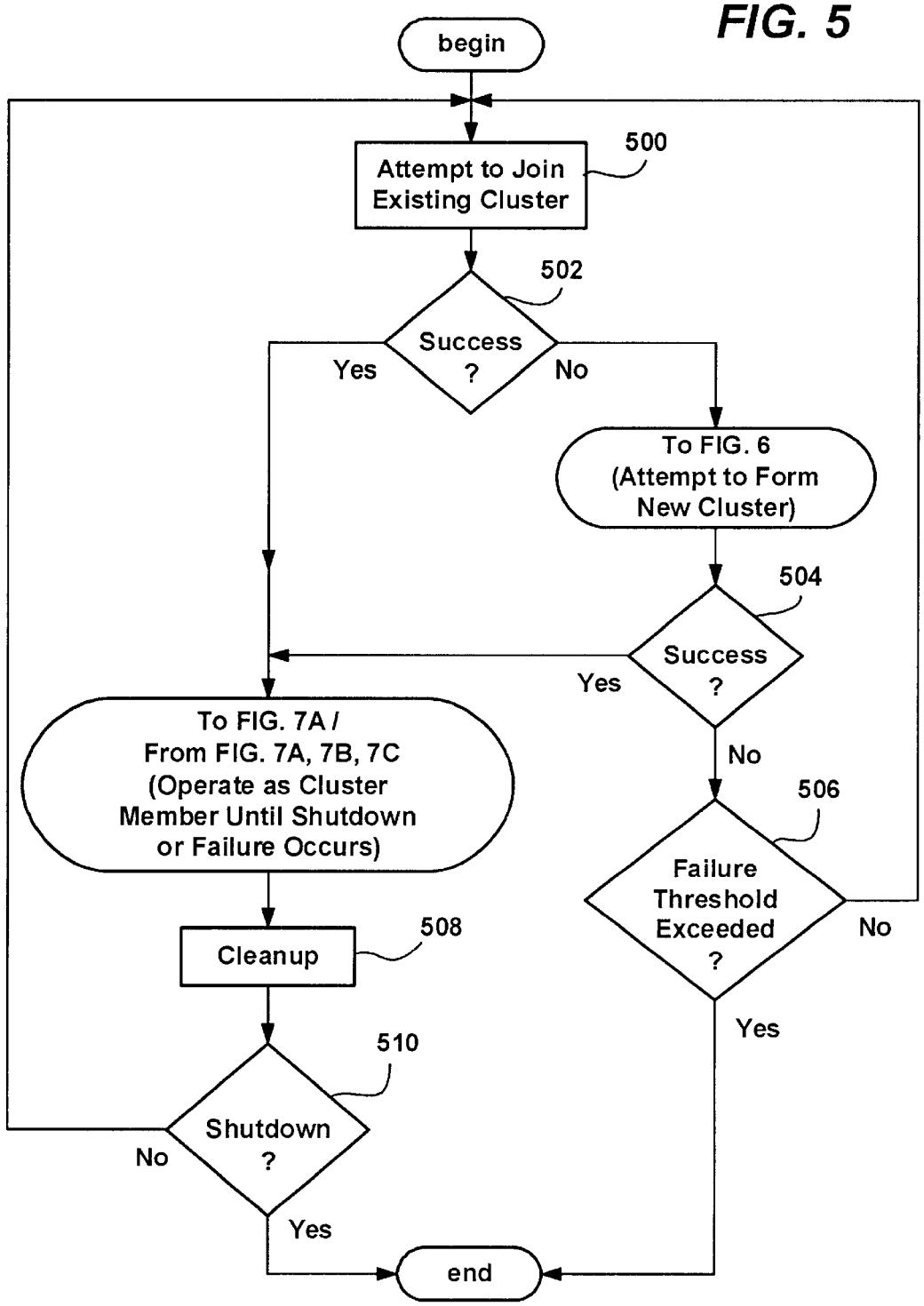
FIG. 5 is a flow diagram representing the initial steps taken by a node to join a cluster or form a new cluster.

More particularly, as shown in FIG. 5, beginning at step 500, a node that is not already part of a cluster first assumes that some instance of the cluster is operational and attempts to join that existing cluster, as described previously. If not successful as determined by step 502, the node will attempt to form a new cluster by arbitrating for control of a quorum (e.g., a majority) of the total replica set members, as described below with reference to FIGS. 6–11. If successful as determined by step 502, the node joins the existing cluster and performs some work as specified by the cluster, i.e., as set by an administrator, as described below with reference to FIGS. 7A–7C. The node continues to perform work until it is shut down, fails, or some event occurs, such as the node stops communicating with the cluster or a replica member fails, as described below.

Figure 4:
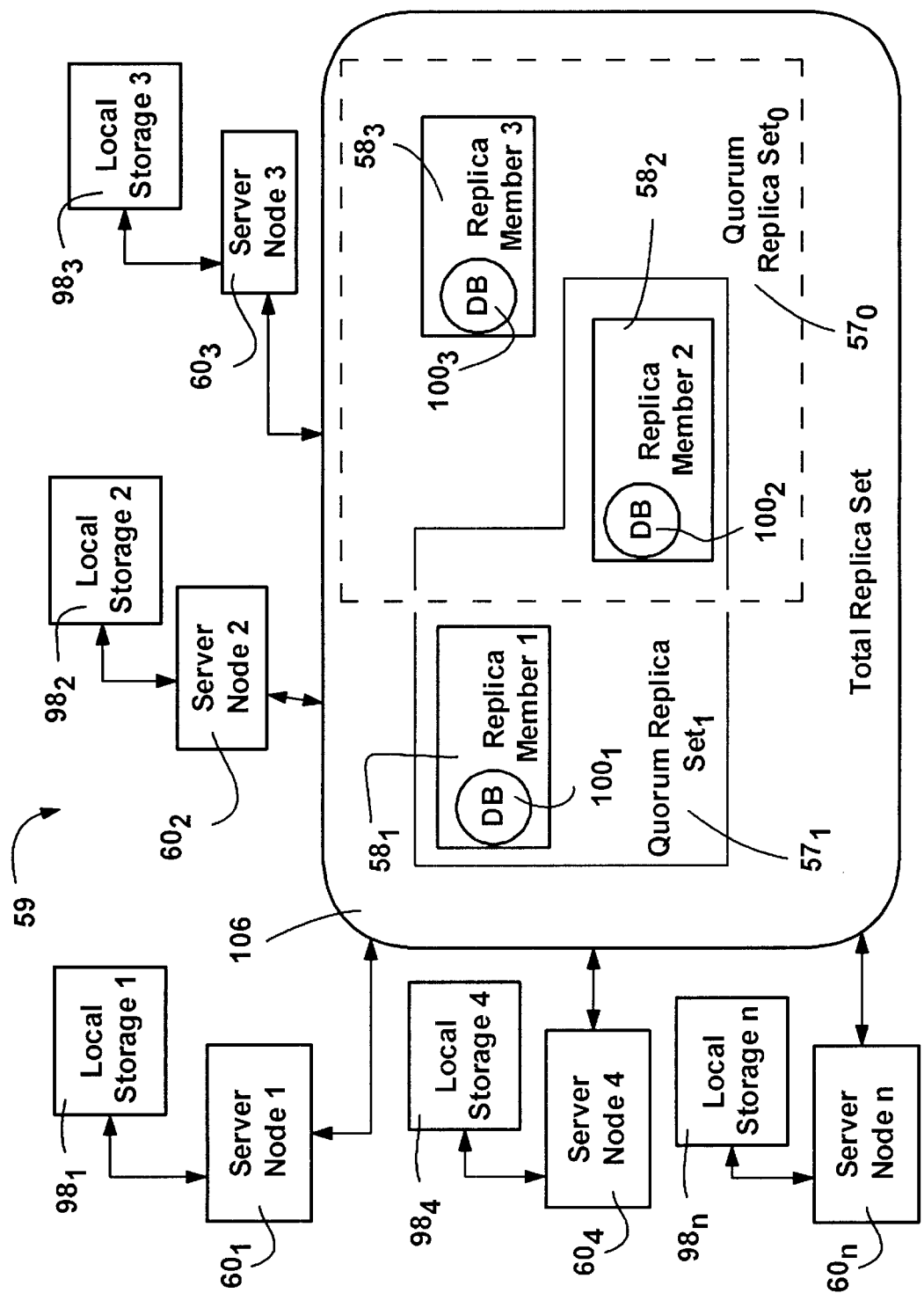
FIG. 4 is a block diagram representing a server cluster having a plurality of replica members therein for storing cluster operational data in accordance with one aspect of the present invention.

In accordance with one aspect of the present invention, to form a cluster, a node has to obtain access to a quorum of the replica members $58_1$–$58_n$, e.g., at least a simple majority thereof. As described above, the replica members $58_1$–$58_3$ include the cluster operational data on respective databases $100_1$–$100_3$ (FIG. 4). The quorum requirement ensures that at least one replica member is common to the previous cluster, whereby via the common member or members, the cluster will possess the latest cluster operational data. The quorum further ensures that only one unique cluster may be formed at any given time. As a result, the node owning the quorum replica set thus possesses the information necessary to properly configure a new cluster following a temporal partition.

By way of example, FIG. 4 shows two quorum replica sets $57_0$ and $57_1$ which may be formed from the total number of replica members available 106, (i.e., three in the present example). Replica Set$_0$ $57_0$, represented by the surrounding dashed line, was the prior quorum replica set used by the immediately prior cluster for recording cluster operational data, and included replica members $58_2$ and $58_3$. Some time later, a new cluster is formed with Replica Set$_1$ $57_1$ as the quorum replica set, which, as represented by the surrounding solid line, includes replica members $58_1$ and $58_2$. Since more than half (two or more in the present example) of the total members available 106 are required to form a cluster, one replica member is common to any previous cluster. In the present example, the replica member $58_2$ is common to both replica sets, and thus maintains the correct cluster operational data from the prior cluster. Note that any permutation of the server nodes $60_1$–$60_n$ may have been operating in the previous cluster, as long as one node was present. Indeed, a significant benefit of the present invention is that at a minimum, only one node need be operational to form and/or maintain a cluster, which greatly increases cluster availability. In addition, only a subset of the disks used to store the cluster operational data (two in the present example) need to be available.

Figure 3B:
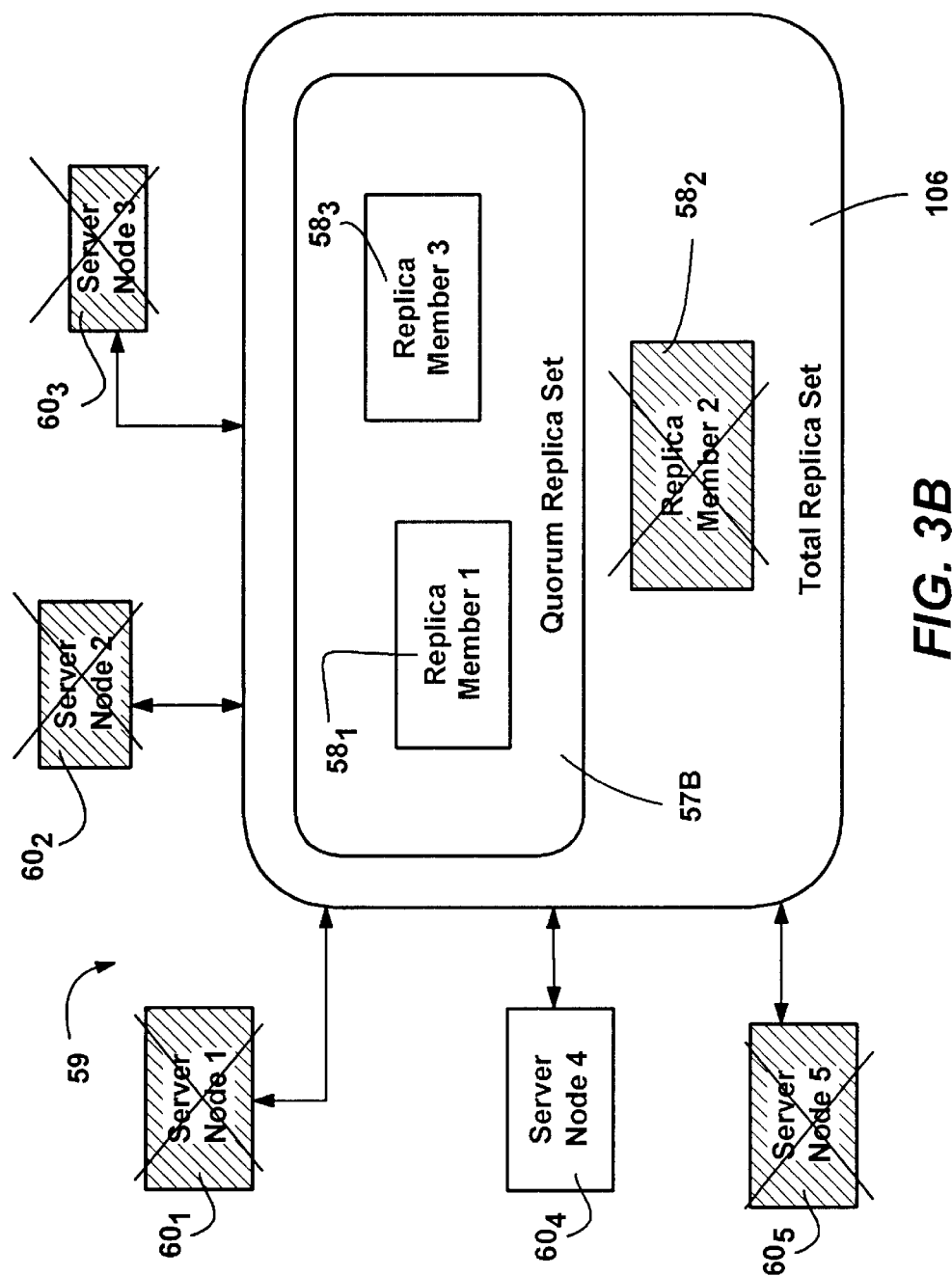

FIGS. 3A and 3B show how the present invention increases cluster availability. In FIG. 3A, a cluster is operating with eight total components comprising five nodes $60_1$–$60_5$ and a replica set $57_A$ having three replica members $58_1$–$58_3$ (out of three total replica members available to the cluster). Some time later, as represented in FIG. 3B, only the node $60_4$ has survived, along with a modified quorum replica set $57_B$ comprising a majority two members $58_1$, and $58_3$ of the three available replica members. Not only is the cluster capable of operating with a minority of nodes, (only one is needed regardless of the total available), but the cluster functions with a minority of total components (three of at least eight).

Figure 6:
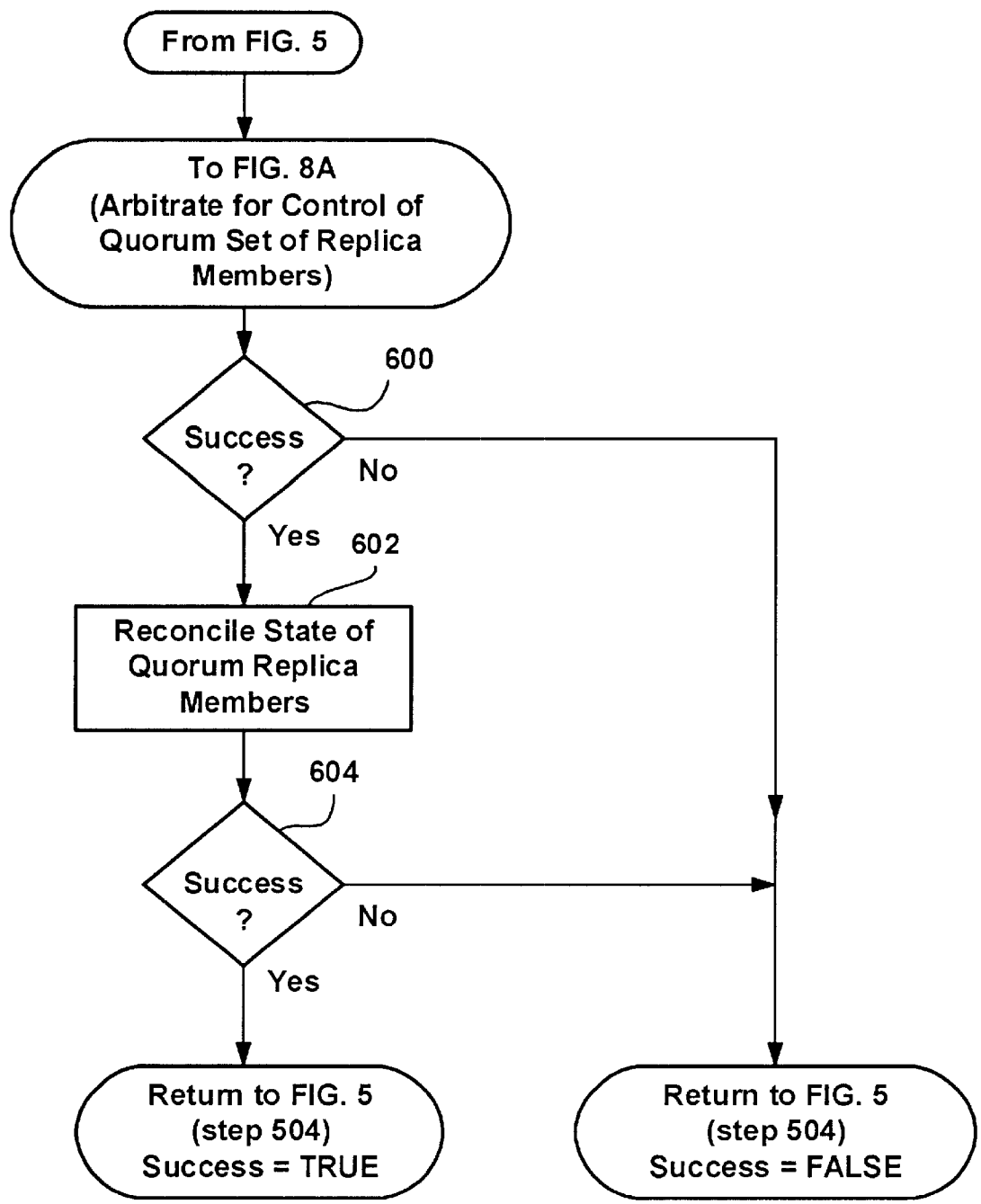
FIG. 6 is a flow diagram generally representing the logic when forming a cluster in accordance with one aspect of the present invention.

In keeping with the invention, any node may start a cluster following a temporal partition, regardless of the number of functioning nodes, since by effectively separating the cluster operational data from the nodes, there is no requirement that a majority of nodes be operational. Thus, for example, in FIG. 4, the node $60_3$ may have formed the latest cluster 59 by first having obtained exclusive control (described below) of the replica members $58_1$ and $58_2$ of the quorum replica set $57_1$. To this end, as shown in FIG. 6, the node attempting to form a cluster first arbitrates for control of a quorum replica set (e.g., $57_1$) of replica members from the total replica set set 106 available to the cluster, as described below beginning at FIG. 8A, step 800.

More particularly, because only one node may have possession of the quorum replica set when a cluster is formed, and also because a node having exclusive possession thereof may fail, there is provided a method for arbitrating for exclusive ownership of the replica members, typically by challenging (or defending) for an exclusive reservation of each member. A method for releasing an exclusive reservation may also be provided. Arbitration may thus occur when a node first starts up, including when there is no cluster yet established because of a simultaneous startup of the cluster's nodes. Arbitration also occurs when a node loses contact with the owner of the quorum replica set, such as when the owner of the replica set fails or the communication link is broken as described below. Arbitration for and exclusive possession of a single quorum device by two nodes are described in detail in the aforementioned U.S. patent application Ser. No. 08/963,050.

In accordance with another aspect of the present invention, the arbitration/exclusive ownership process has been extended to accommodate a cluster of more than two nodes. In general, to obtain control over the members of the quorum replica set $57_1$, an arbitration process leverages the SCSI command set in order for systems to exclusively reserve the SCSI replica members' resources and break any other system's reservation thereof. The preferred mechanism for breaking a reservation is the SCSI bus reset, while a preferred mechanism for providing orderly mutual exclusion is based on a modified fast mutual exclusion algorithm in combination with the SCSI reserve command. The algorithm is generally described in the reference entitled, "A Fast Mutual Exclusion Algorithm," Leslie Lamport, ACM Transactions on Computer Systems, 5(1), (February 1987), incorporated by reference herein. Control is achieved when a quorum of replica members is obtained by a node.

Figure 8A:
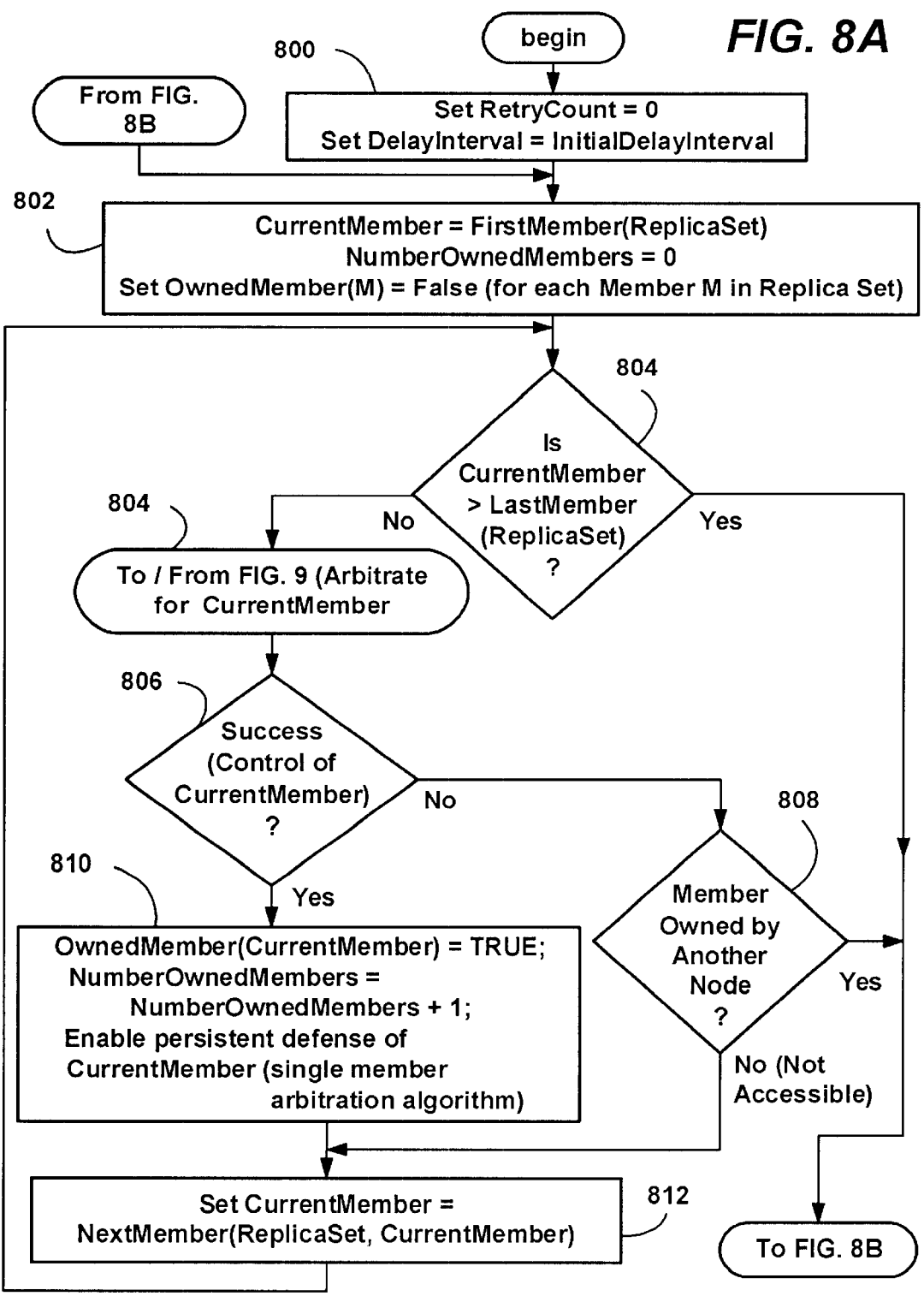
FIGS. 8A–8B comprise a flow diagram representing the steps taken by a node to attempt to gain control over a quorum replica set of replica members in accordance with one aspect of the present invention.
Figure 8B:
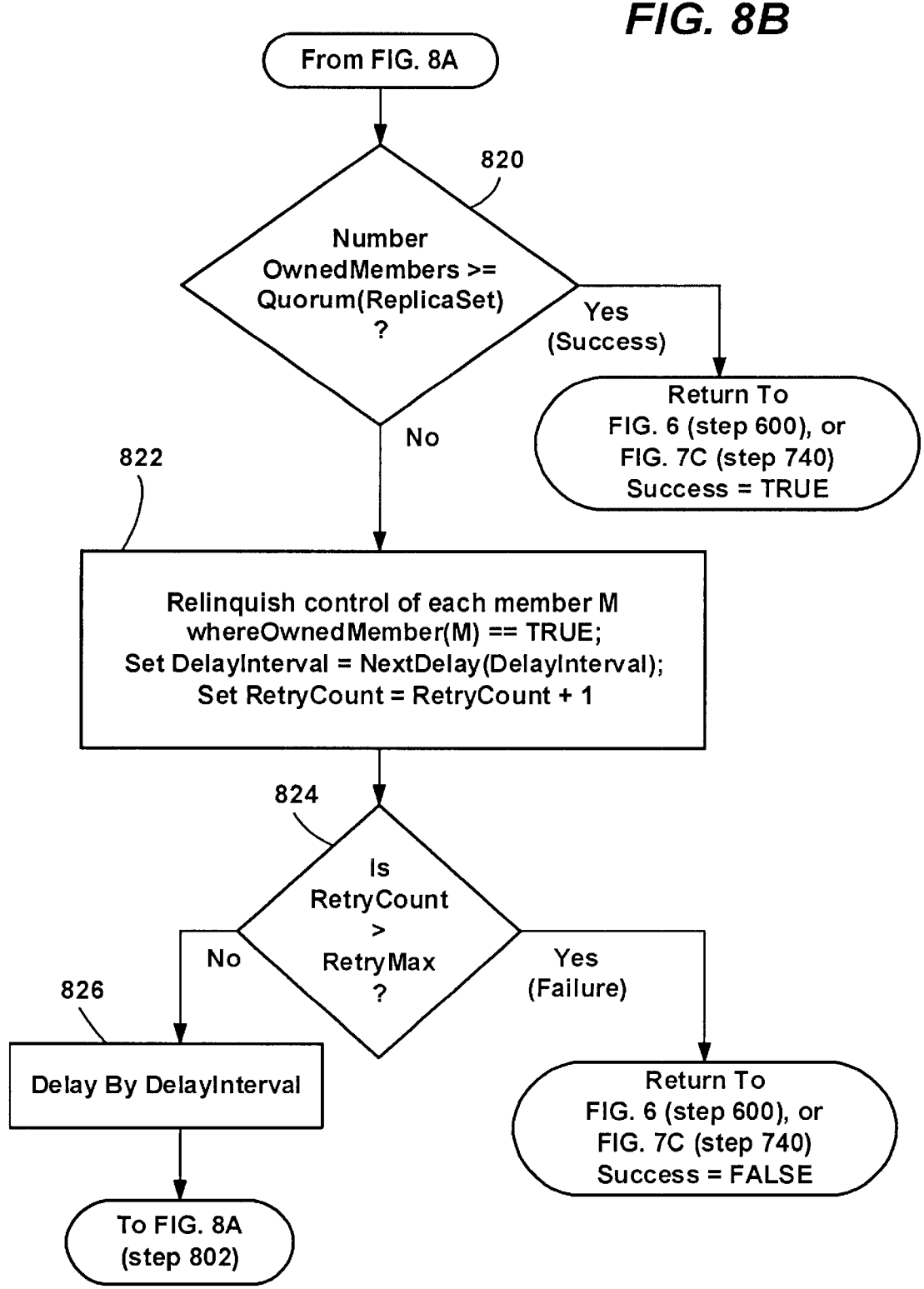
Figure 9:
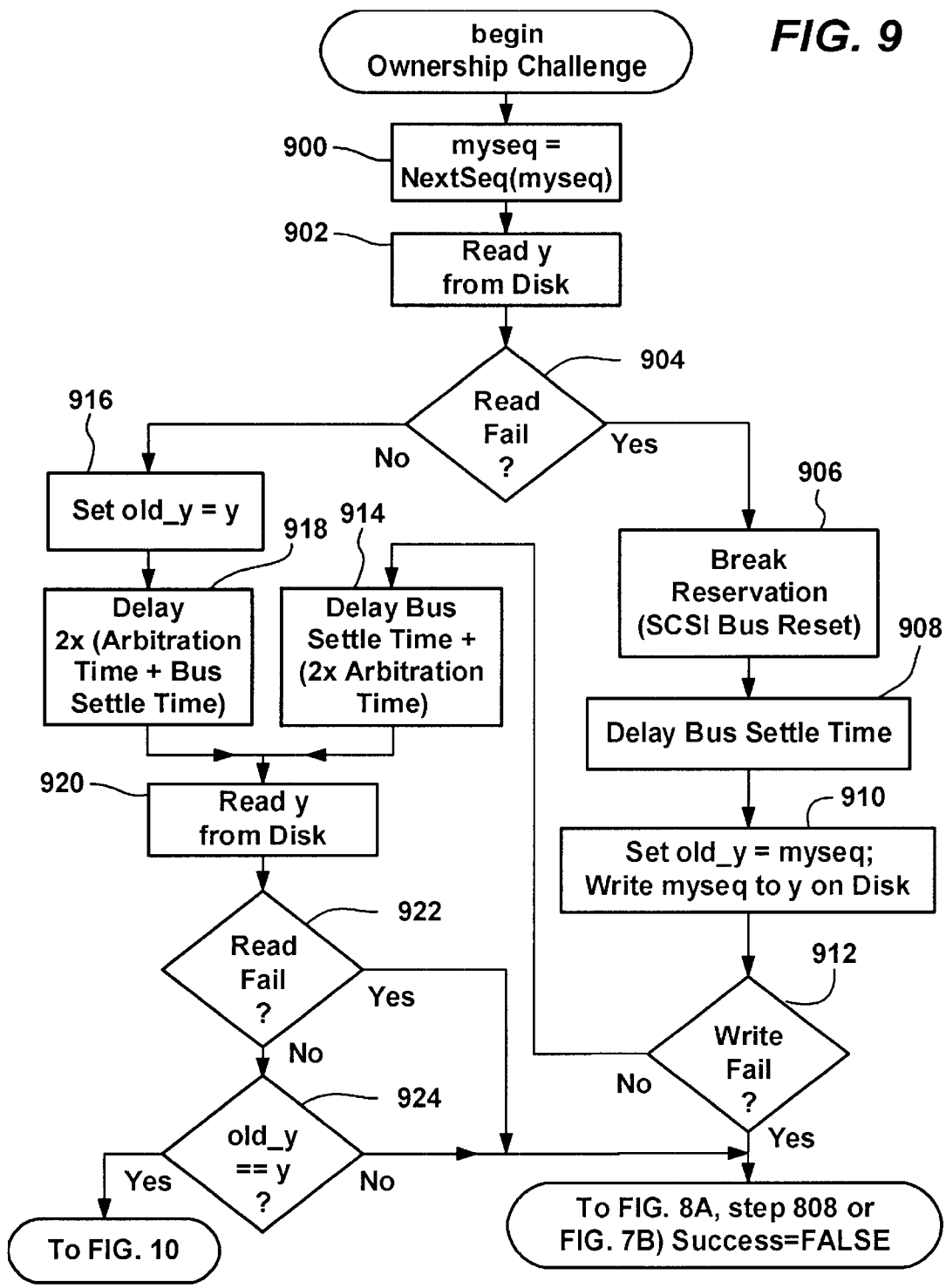
FIGS. 9 and 10 are flow diagrams generally representing the steps taken to arbitrate for control of a replica member in accordance with one aspect of the present invention.
Figure 10:
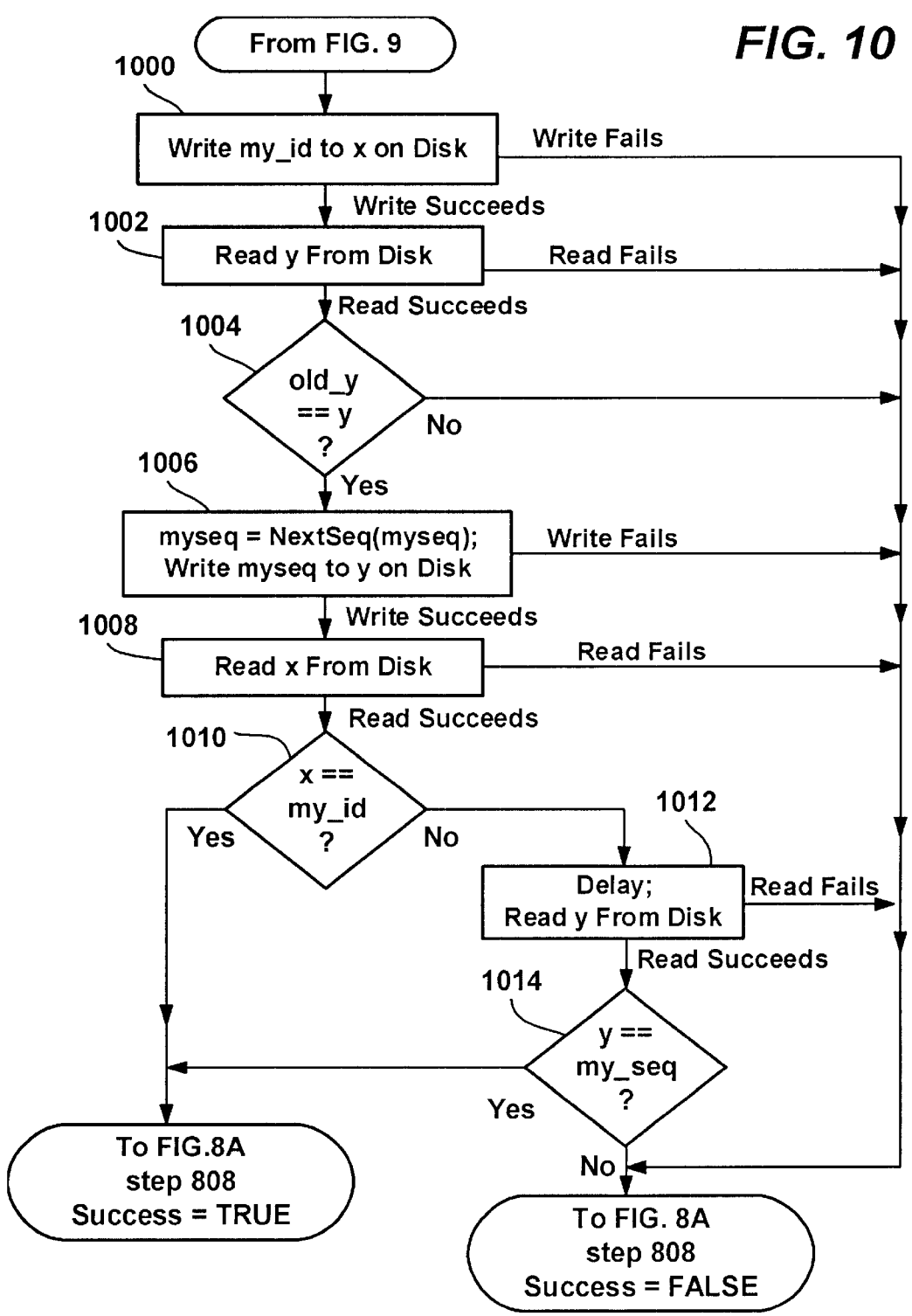

FIGS. 8A and 8B, in combination with FIGS. 9 and 10, provide general steps for arbitrating for control of a qourom of the members of a replica set. It should be noted that FIGS. 8A and 8B assume that the identity of at least a quorum of the members of the replica set are known to the nodes performing arbitration, and further, that a total order is imposed on the replica members, and this order is known to the nodes performing arbitration. As described above, such information is written to a node's local storage when the node is joined to the cluster.

Step 800 of FIG. 8A begins the process for arbitrating for the replica set by initializing some variables, i.e., setting a loop counter (RetryCount) to zero and a delay interval variable equal to an initial value. Similarly, step 802 initializes some additional variables, setting the current member (according to the known ordering) to the first member of the replica set, and zeroing a count that will be used for tracking the number of owned members against the quorum requirement. Step 802 also sets an array that tracks which members are owned by the node to false, since no members are owned at this time. Step 804 then tests the current member against the order number of the last member in the total replica set, to determine whether arbitration has been attempted on each member in the total set of replica members. At this time, the first member is still the current member, and thus step 804 branches to arbitrate for this current member, as represented in the steps beginning at step 900 of FIG. 9.

FIG. 9 represents the arbitration process for a single replica member, (e.g., $58_1$), which generally begins by first determining if a node owns the replica member $58_1$, and if so, whether that node is effectively dead (e.g., crashed or paused/operating very slowly, sometimes referred to as comatose). To this end, step 900 of FIG. 9 first sets a variable, (myseq), for this arbitration that is guaranteed to be unique to this cluster, e.g., the node's cluster-unique identifier in the high bits of the myseq variable plus a current time value in the low bits. Then, at step 902, the node (e.g., $60_1$) attempts to read a variable, y, from a specific location on the current replica member $58_1$.

A first possible outcome to the read request is that the read will fail (as detected at step 904) because another node (e.g., $60_2$) has previously placed (and not released) a reservation on the quorum member $58_1$. At this time, there is a possibility that the other node $60_2$ that has exclusive control of the quorum replica member $58_1$ has stopped functioning properly, and consequently has left the replica member $58_1$ in a reserved (locked) state. Note that the nodes $60_1$ and $60_2$ are not communicating, and thus there is no way for node $60_1$ to know why the communication has ceased, e.g., whether the other node $60_2$ has crashed or whether the node $60_1$ itself has become isolated from the cluster 59 due to a communication break. Thus, in accordance with another aspect of the present invention, the arbitration process includes a challenge-defense protocol to the ownership of the members of the quorum replica set $57_1$ that can shift representation of the cluster from a failed node $60_2$ to another node $60_1$ that is operational.

To accomplish the challenge portion of the process, if the read failed, at step 906, the challenging node $60_1$ first uses the SCSI bus reset command to break the existing reservation of the quorum replica member $58_1$ held by the other node $60_2$. Next, after a bus settling time (e.g., two seconds) at step 908, the node $60_1$ saves the unique myseq identifier to a local variable old_y and attempts to write the myseq identifer to the y-variable location on the replica member $58_1$. Note that the write operation may fail even though the reservation has been broken because another node may have exclusively reserved the replica member $58_1$ (via its own arbitration process) between the execution of steps 906 and 910 by the node $60_1$. If the write fails at step 912, the node $60_1$ knows that another node is competing for ownership, whereby the node $60_1$ backs off by failing the arbitration and appropriately returning with a "FALSE" success code. Note that the write may also fail if the replica member has failed, in which event it cannot be owned as a quorum member, whereby the "FALSE" return is also appropriate.

However, if the write was successful as determined at step 912, the arbitration process of the node $60_1$ continues to step 914 where the challenging node $60_1$ delays for a time interval equal to at least two times a predetermined delta value. As described below, this delay gives a defending node an opportunity to persist its reservation of the replica member $58_1$ and defend against the challenge. Because nodes that are not communicating cannot exchange node time information, the delta time interval is a fixed, universal time interval previously known to the nodes in the cluster, at present equal to a three-second arbitration time, and a bus-settling time of two seconds. Note, however that one bus settling time delay was already taken at step 908, and thus step 914 delays for double the arbitration time but only one additional bus settling time, e.g., eight more seconds. After this delay, step 920 again attempts to read the y-variable from the replica member $58_1$.

Returning to step 904, if the reading of the y-variable was successful, then no node had a reservation on the replica member $58_1$ and the local variable old__y is set to the y-variable (step 916) that was read. However, it is possible that the read was successful because it occurred just after another arbitrating node broke the exclusive reservation of a valid, operational owner. Thus, before giving the node $60_1$ exclusive control (ownership) of the replica member $58_1$, step 916 branches to step 918 to delay a period of time sufficient to enable the present exclusive owner, (if there is one), enough time (e.g., the full two-delta time of ten seconds) to defend its exclusive ownership of the current member. After the delay, step 918 continues to step 920 to attempt to re-read the y-variable.

Regardless of the path taken to reach step 920, if the read at step 920 failed as determined by step 922, then the arbitration is failed because some node reserved the replica member $58_1$. Alternatively, if at step 924 the member's y-variable that was read changed from its value preserved in the local old__y variable, then a competing node appears to be ahead in the arbitration process, and the node $60_1$ backs off as described below so that the other node can obtain the quorum. However, if the y-variable has not changed, it appears that no node is able to defend the replica member $58_1$ and that the node $60_1$ may be ahead in the arbitration, whereby at step 924 the arbitration process continues to step 1000 of FIG. 10.

Note that it is possible for a plurality of nodes to successfully complete the challenge procedure of FIG. 9 and reach step 1000 of FIG. 10. In accordance with one aspect of the present invention, a mutual exclusion algorithm is executed to ensure that only one of the plurality of nodes succeeds in completing the arbitration process. In accordance with the principles of a fast mutual exclusion algorithm, at step 1000 of FIG. 10, an attempt is made to write an identifier unique from other nodes to a second location, x, on the replica member $58_1$. Note that as shown in FIG. 10, for purposes of simplicity, any time a read or write operation fails, the arbitration is failed, and thus only successful operations will be described in detail herein. Then, steps 1002 and 1004 again test whether y's value on the replica member $58_1$ still equals the old__y variable, since it may have just been changed by another node, e.g., node $60_3$ wrote to y while the operation of writing the x value by the node $60_1$ was taking place. If changed, at least one other node is apparently contending for ownership, and thus step 1004 backs off, i.e., fails the arbitration process.

If y is still unchanged at step 1004, step 1006 generates a new unique myseq sequence identifier for the node $60_1$ into the y location on the replica member $58_1$, and if successful, continues to step 1008 where the value at the x location is read. If at step 1010 the x location still maintains the my__id value (written at step 1000), then this node $60_1$ has won the arbitration, and returns with a success return code of "TRUE." Alternatively, if at step 1010, the x location no longer maintains the ID of the node $60_1$, then apparently another node (e.g., $60_4$) is also challenging for the right to obtain exclusive control. However, it is possible that the other node $60_4$ has changed the x value but then backed off because the y-value was changed, (e.g., at its own steps 1002–1004), whereby the node $60_1$ is still the leader. Thus, after a delay at step 1012 to give the other node time to write to the y-location or back off, the y-value is read, and if the y value is changed at step 1014, then the arbitration was lost. Note that a node which wins the arbitration writes the y-location immediately thereafter as described below with reference to FIG. 11.

Conversely, if the y value is still equal to the unique sequence ID (myseq) of the node $60_1$ at step 1014, then this node $60_1$ has won the arbitration, and returns with the "TRUE" success return code. Note that the mutual exclusion mechanism of steps 1000–1014 (run by each competing node) ordinarily ensures that only one node may ever reach step 714 to persist the reservation, because only the node having its ID in the y-location can enter this critical section, while the x-location is used to determine if any other nodes are competing for the y-location. However, there is a non-zero probability that more than one node will successfully complete the arbitration procedure, given arbitrary processing delays. This problem is eliminated by the fact that a node places a SCSI reservation on a replica set member after successfully completing arbitration, as will be discussed later with reference to FIG. 11.

Returning to FIG. 8A, step 806 evaluates the code returned for the current member from the single-member arbitration algorithm of FIGS. 8 and 9. If not successful, step 806 branches to step 808 to determine whether the failure to obtain control was caused by the member being owned by another node, or whether the member was inaccessible, e.g., crashed or not properly connected to the challenging node $60_1$. If owned by another node, step 808 branches to FIG. 8B to determine whether the challenging node $60_1$ already has a quorum, or should back off and relinquish any members controlled thereby as described below. If the failure occurred because the member was not accessible (as opposed to owned), step 808 branches to step 812 to repeat the process on the next member, as described below.

If at step 806 it is determined that the challenging node $60_1$ was successful in obtaining control of the replica member $58_1$, step 806 branches to step 810. At step 810, the array tracking the node's control of this member is set to "TRUE," the count used for determining a quorum is incremented, and the replica member $58_1$ is set to be defended by the node $60_1$ if the node $60_1$ is able to achieve control over a quorum of the members. Defense of an owned member is described below with reference to FIG. 11. Then, at step 812, the current member is changed to the next member (if any) and the process returns to step 804 to again arbitrate for control of each remaining member of the total replica set of available members.

Step 820 of FIG. 8B is executed when the replica members have all been arbitrated (step 804 of FIG. 8A) or if an arbitrated replica member was owned by another node (step 808 of FIG. 8A) as described above. Step 820 tests whether the count of members owned by the challenging node $60_1$ achieved a quorum. If so, step 820 returns to its calling location with a "TRUE" success code whereby the next step in forming a cluster will ultimately take place at step $60_2$ of FIG. 6, as described below.

If a quorum is not achieved, step 820 branches to step 822 to relinquish control of any replica members that the node $60_1$ obtained ownership over, recompute the delay interval, and increment the retry (loop) counter. Step 824 then repeats the process after the delay interval at step 826 by returning to step 802 of FIG. 8A, until a maximum number of retries is reached. Typically the delay calculation in step 822 uses a well-known "exponential backoff" as follows:

$$\text{BackoffTime} = \text{BackoffTime0} * (E^n) * \text{Rand}(\ ) + \text{BackoffTimeMin},$$

where BackoffTime0 is the maximum backoff time for the first try, E is a number greater than 1, typically 2 for convenience, n is the retry number (0 based), ^ represents exponentiation (raised to the power), BackoffTimeMin is the smallest practical backoff time, and Rand ( ) is a function that returns a random number between 0 and 1.

If no quorum is achieved after retrying, the process ultimately returns to step 504 with a failure status. Steps 504 and 506 will repeat the attempt to join an existing cluster or start the formation attempt over again, until some threshold number of failures is reached, whereby some action such as notifying an administrator of the failure may take place.

It should be noted that FIGS. 8A and 8B describe a probabilistic algorithm. In general, the ordering requirement, the restart of the process upon failure to control a member, and the random exponential backoff, when taken together, provide some non-zero probability that one of a plurality of independent (non-communicating) arbitrating nodes will successfully gain control of a quorum of the members in the set. The probability may be adjusted by tuning various parameters of the algorithm. Note that the use of exponential backoff techniques in arbitration algorithms is well known to those skilled in the art, e.g. it is the basis for CSMA/CD networks such as Ethernet. Moreover, note that the probabilistic nature of the overall algorithm is different than the probability that more than one node will successfully complete the arbitration procedure, given arbitrary processing delays, as described above.

Returning to step $60_2$ of FIG. 6, when a quorum is achieved, an attempt is made to reconcile the replica members so that the correct cluster operational data may be determined. As described above, a requirement on any mechanism for maintaining the cluster operational data is that a change made to the data by a first instance of a cluster be available to a second instance of the cluster that is formed at a later time. In other words, no completed update may be lost. In order to meet these requirements for a set of replica members, changes to the cluster operational data must be applied atomically and consistently to a quorum of the replica members, thereby guaranteeing that at least one member of any quorum set has the latest data. One known way to accomplish this goal is to apply each update to the cluster operational data as part of a transaction, as described in the references, "Transaction Processing: Concepts and Techniques" by Jim Gray and Andreas Reuter, and "Weighted Voting for Replicated Data" by David K. Gifford, SOSP (1979), herein incorporated by reference.

More particularly, a variant of the transactional technique known as a two-phase commit is utilized. In the first phase of the two-phase commit, a record containing the new data is written to a log on each quorum set member. This is called a "prepare" record. The first phase completes when the prepare record has been replicated to all quorum set members. During the second phase, a "commit" record is written to the log of each quorum set member and the new data is applied to the persistent operational data on that member. A change is complete only when the commit record has been replicated to all quorum set members. Moreover, changes to the cluster operational data are totally ordered, i.e., a second change is applied only after a first change has been completed. Note that there are many well-known variations on two-phase commit procedure that provide various performance benefits.

In order to reconcile the states of different members of a replica set, a monotonically increasing sequence number is associated with each change to the cluster operational data (generation of sequence numbers is described below). The current value of this sequence number is stored on each replica member and is included in the prepare and commit records. Thus, the most current version of the cluster operational data is contained on the member or members with the highest sequence number. When a node forms a cluster, it chooses a member of the quorum replica set having the highest sequence number as the master copy of the cluster operational data. Out-of-date members are reconciled by replicating missing updates from the master.

However, a cluster may fail at any point during the two-phase commit process, resulting in a partially applied update. Because an update to the cluster operational data must be committed to the entire quorum set before a subsequent change is made, there can be at most one update in progress when a particular incarnation of a cluster fails. This partial update is either completed or discarded during formation of subsequent clusters. Note that an partial update was not prepared on all nodes of the quorum set when an incarnation of the cluster fails, it is possible for a subsequent incarnation of the cluster to make another partial update before the first partial update is handled. The cluster formation procedure guarantees that at most one of these competing updates is completed before any subsequent updates are begun, thereby guaranteeing consistency of the cluster operational data, as described below.

The sequence number used as part of the update process is implicitly part of the cluster operational data. The sequence number is incremented consistently across instances of a cluster in order to maintain the consistency of the cluster operational data. In particular, it must not be possible for two different updates that were applied by two different cluster instances to have the same sequence number. In order to resolve this problem, known methods of updating a set of replica members rely on a consistent notion of time to manufacture unique sequence numbers for each update. As long as the interval between timestamp increments is less than the minimum amount of time needed to start and complete an update, the uniqueness requirement is met. This method requires a highly available common time source or very reliable, and synchronized, time sources on each of the cluster nodes. Moreover, the time source has a fine enough granularity to meet the uniqueness requirement for a given cluster.

The specific procedure for reconciling the states of the members of the quorum replica set during cluster formation is as follows, wherein it is assumed that the forming node has obtained control of a quorum of the total replica members. It is also assumed that the after-image journaling method is in use, although other known equivalent journaling techniques could also be used, albeit with a different procedure. It is further assumed that the sequence number of a given quorum replica set member is advanced as part of the process of writing a prepare record to that member, and that the sequence number of the last update committed to a given quorum replica set member is recorded on that member.

First, the forming node replays the log of each quorum replica set member to ensure that the member's data is self-consistent. Partially written records are discarded (undone). Second, the forming node queries each member of the quorum replica set in order to determine which one has the highest sequence number value. That member has the most current copy of the cluster operational data, and will hereinafter be referred to as the Master member. Note that if two members have the same sequence number, and one of them has committed the update associated with that sequence number while the other has only prepared it, then the member that has committed the update is chosen to be the Master member. If two or more members have all committed an update, then any one of those members may be chosen to be the Master member. Likewise, if no member has committed the update, then any member that has prepared it may be chosen as the Master member.

Next, partially applied updates are reconciled using the following procedure. Let Smax denote the current sequence number of the Master member, and let Sm denote the current sequence number on a replica member, M, of the quorum replica set. For each member, M, for which Sm<Smax, and for which Sm is associated with a prepared, but not committed, update, then the prepared update is discarded (undone) and Sm is set equal to the sequence number of the last update committed to M. At the end of this step, at most one prepared, but not committed, update remains. Any such update will have sequence Smax, and may be present in a prepared state on multiple members of the quorum replica set. Note that it is not possible for a discarded update to have been committed on any member of the total replica set.

If Smax on the Master member is associated with an update that has been prepared, but not committed, then the next step is to commit that update on the Master member. This action guarantees that if an update was committed on any member of the total replica set, then it will eventually be committed on a quorum replica set. Thus, no update is ever lost. Next, for any member, M, for which Sm=Smax, and for which the update associated with Sm is prepared but not committed, that update is committed to M. These members are now fully reconciled with the Master member.

At this point, all partial updates have been reconciled, and no member of the quorum replica set has an update that has been prepared, but not committed. Finally, for any member, M, for which Sm<Smax, replicate to M, from the Master member, all updates that occurred after Sm, (i.e., up to and including Smax), and then set Sm=Smaster member. Note that it is equivalent to replicate the entire contents of the Master member to M instead of just the missing updates, when desired, such as when more convenient.

The failure of any read or write operation on a quorum replica set member during this procedure is treated as a failure of the replica member, (although the operation may be optionally retried some number of times before declaring failure). A failed replica member is removed from the quorum replica set. The cluster may continue operating despite the failure of a member of a quorum replica set at any point, as long as the remaining set still constitutes a quorum. If the remaining set does not constitute a quorum, then the cluster must cease operating, as described below. If the quorum requirement is still met after a replica member failure, any update or reconciliation procedure that was in progress when the member failed continues forward unaltered, after the failed member has been removed from the quorum replica set. This procedure guarantees that all updates to the cluster operational data are sequentially consistent, that no committed update is ever lost, and that any cluster instance, which controls a quorum of the total replica set members, will have the most current cluster operational data.

If the reconciliation of the members at step $60_2$ is determined to be successful at step $60_4$, the process returns to step 504 of FIG. 5 with a "TRUE" success status, otherwise it returns with a "FALSE" status. As described above, based on the status, step 504 either allows the cluster to operate or restarts the join/formation attempt up to some threshold number of times.

Figure 7A:
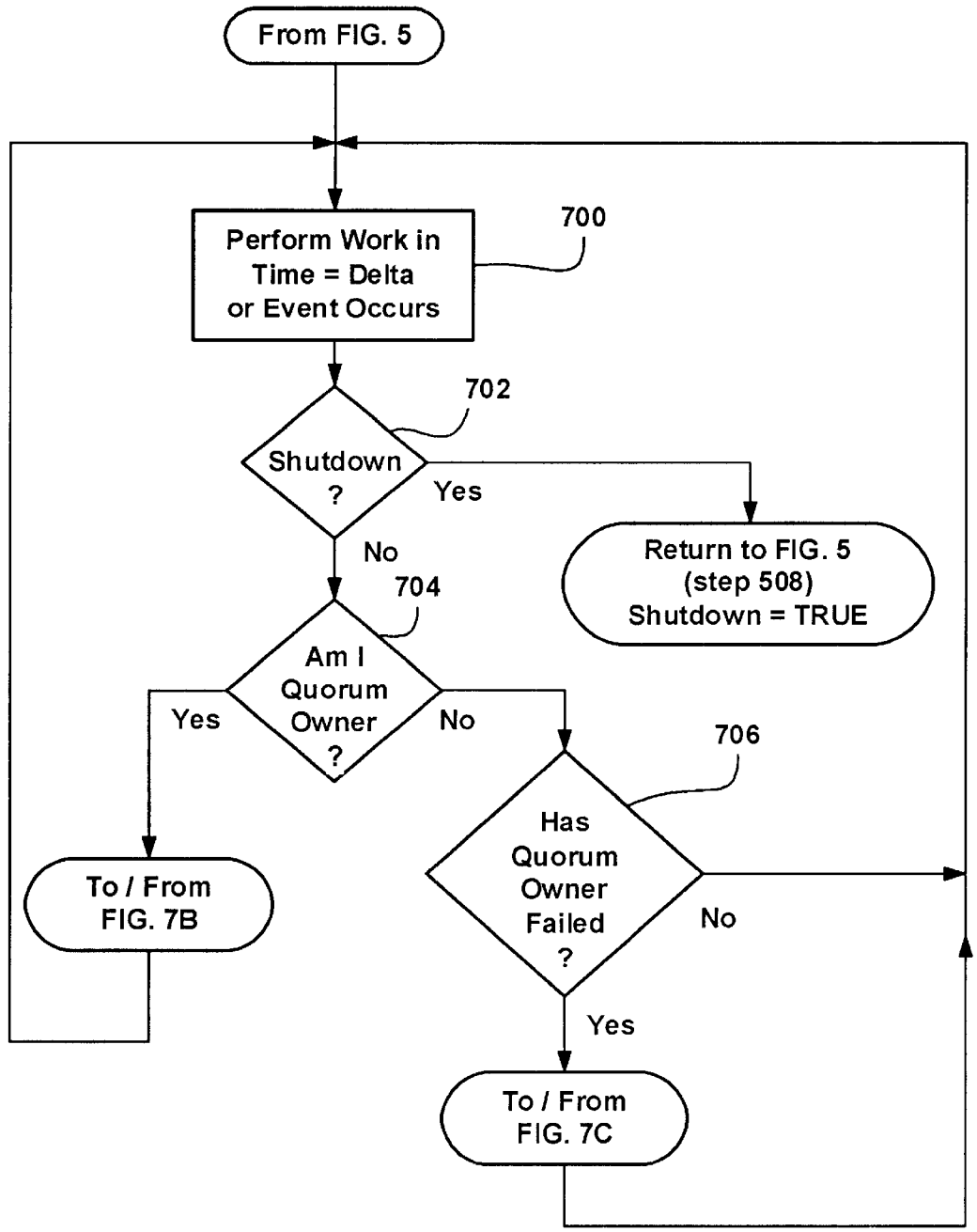

Step 700 of FIG. 7A represents the performing of work by the cluster. In general, the work continues until some event occurs or a time of delta elapses, where delta is the arbitration time (e.g., three seconds) described above. Preferably, the node continues to perform work and runs a background process when an event/time interval is detected. Events may include a graceful shutdown, a failure of a replica member, and a failure of a node. Step 702 tests if a shutdown has been requested, whereby if so, step 702 returns to step 508 of FIG. 5 with a TRUE shutdown status. Step 508 performs various cleanup tasks, and step 510 tests the shutdown status, ending operation of the node if TRUE.

If not a shutdown event, step 702 of FIG. 7A branches to step 704 where the node makes a decision based on whether the node is the owner of the quorum of replica members. If so, step 704 branches to step 720 of FIG. 7B, described below, while if not step 704 branches to step 706 where the quorum owner's communication with the node is evaluated. If the quorum-owning node is working, step 706 returns to step 700 to resume performing work for the cluster. Otherwise, step 706 branches to step 740 of FIG. 7C, as described below.

Figure 7B:
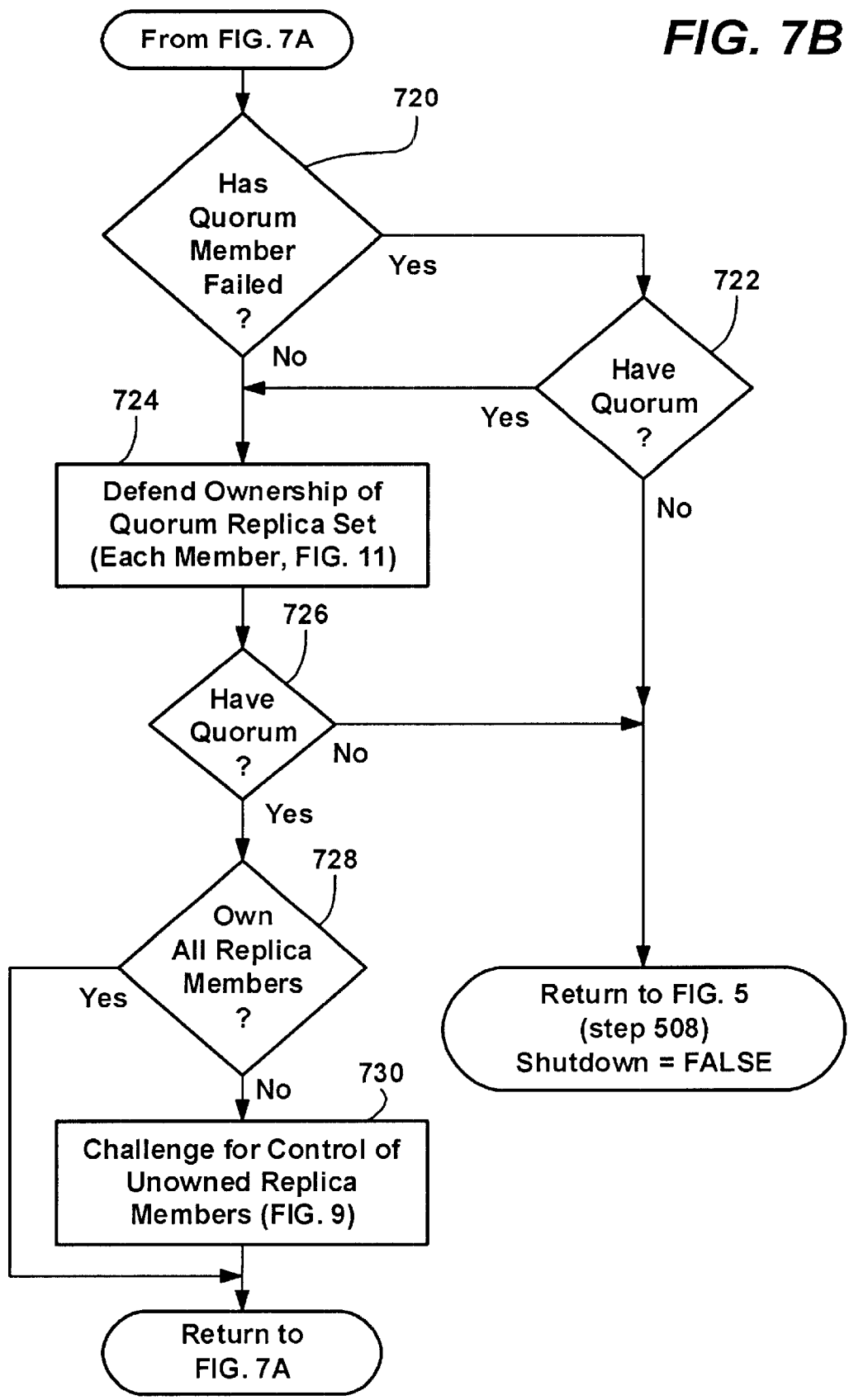

Turning first to FIG. 7B, when a node e.g., $60_2$ represents the cluster, at step 720 the node tests whether an event corresponded to a failure of one or more of the replica members. If so, step 722 is executed to determine if the node $60_2$ still has control of a quorum of replica members. If not, step 722 returns to step 508 of FIG. 5 with a "FALSE" shutdown status whereby the cleanup operation will take place and the cluster join/formation process will be repeated for this node $60_2$. However if the node $60_2$ still has a quorum of members, step 722 branches to step 724 to defend ownership of each of the members, as described below. Note that the defense of the members (FIG. 11) is essentially performed on each member in parallel.

As shown at step 1100 of FIG. 11, to defend each of the owned replica members, the node $60_2$ first sets a loop counter for a number of write attempts to zero, and then attempts to exclusively reserve that member, e.g., via the SCSI reserve command. If unsuccessful, another node has won control of this disk, whereby the node $60_2$ re-evaluates at step 726 of FIG. 7B whether it still possesses a quorum. If the node has lost the quorum, the node $60_2$ will ultimately return to step 508 of FIG. 5 and repeat the join/formation process.

If successful in reserving the disk, step 1104 is next executed where a new myseq value is generated for this node $60_2$ and an attempt is made to write to write the y-variable used in the arbitration process, as described above. The y-variable is essentially rewritten to cause other nodes that are monitoring the y-value after breaking the previous reservation to back off, as also described above. If the write succeeds, the replica member was successfully defended, and the process returns to step 726 of FIG. 7B with a "TRUE" success status. If the write failed, steps 1108–1110 cause the write attempt to be repeated some maximum number of times until the process either successfully defends the replica member or fails to do so, whereby the node needs to re-evaluate whether it still has a quorum, as described above. Note that an added benefit to using the SCSI reservation mechanism is that if a former owning node malfunctions and loses control of a member, it is prevented from accessing that member by the SCSI reservation placed by the new owner. This helps prevent against data corruption caused by write operations, as there are very few times that the members of the quorum replica set will not be exclusively reserved by a node (i.e., only when a partition exists and the reservation has been broken but not yet persisted or shifted).

Returning to step 726 after attempting to defend the members, if the node $60_2$ no longer has a quorum, the node returns to step 508 of FIG. 5 to cleanup and then repeat the join/formation process. Conversely, if the node still possesses a quorum of the members, step 728 is next executed to test whether the node $60_2$ that represents the cluster owns all the members of the total replica set 106 of available members. If so, step 728 returns to step 700 of FIG. 7A. However if not all the members are owned, for reliability and robustness, the node representing the cluster attempts to obtain control of as many of the operational replica members as it can. Thus, at step 730, the node attempts to gain control of any member, M, for which OwnedMember(M)==FALSE, using the single member arbitration algorithm of FIGS. 9 and 10 described above. If there are multiple members that are not owned, the node may attempt to gain control of them in any order, or in parallel.

FIG. 7C represents the steps taken by a node (e.g., $60_1$) that is not in control of the quorum replica set (step 704 of FIG. 7A) and that is no longer communicating (step 706 of FIG. 7A) with the node that was in control of the quorum replica set. First, FIG. 7C calls the process (beginning at FIG. 8A) that arbitrates for control of the replica members of the total replica set. If a quorum is not achieved as ultimately evaluated at step 740, step 742 is executed to determine if the node $60_1$ is now communicating with the quorum owner. Note that ownership may have changed. If connected at step 742, the node $60_1$ returns to FIG. 7A to perform work for the cluster, otherwise the node returns to step 508 of FIG. 5A to cleanup and restart the joining, formation process as described above.

Alternatively, if at step 740 the node successfully acquired control over a quorum of replica members, step 744 is executed to reconcile the quorum members and form the cluster as described above. If successful in reconciling the members, the node $60_1$ returns to FIG. 7A to perform work for the cluster it now represents, otherwise the node returns to step 508 of FIG. 5A to cleanup and restart the joining, formation process as described above.

In alternative implementations, not all of the cluster operational data need be maintained in the replica members $58_1$–$58_3$ only the data needed to get the cluster up and running, as described in the aforementioned copending U.S. Patent application entitled "Data Distribution in a Server Cluster." In one such alternative implementation, the replica members maintain this "core boot" data, and also maintain information regarding the state of the other cluster operational data, (e.g., configuration information about the applications installed on the cluster and failover policies). The state information ensures the integrity of the other cluster operational data, while the other storage device or devices (e.g., a mirror set of storage elements) that store this data provide a relatively high-performance and/or lower cost storage for this additional cluster configuration information, with high reliability. In any event, as used herein, the replica members $58_1$–$58_3$ maintain at least enough information to get a cluster up and running, but may store additional information as desired.

Note that a quorum need not be a simple majority, but may, for example, be some other ratio of operational members to the total number, such as a supermajority (e.g., three of four or four of five). However, a primary benefit of the present invention is to provide availability with the minimum number of components, and such a supermajority requirement would tend to reduce availability.

Instead, cluster availability may be increased by requiring only a simple majority while using a larger number of devices. For example, three replica members may be available for ordinary reliability, in which two disks will have to fail to render the cluster unavailable. However, the more that reliability is desired, the more replica members may be used, (at a cost tradeoff), e.g., three of five failures is less likely than two of three, and so on. Note that SCSI limitations as to the number of replica members and their physical separation need not apply, as described in U.S. patent application Ser. No. 09/260,194 entitled "Method and System for Remote Access of Network Devices," assigned to the same assignee as the present invention, and incorporated by reference herein.

As can be seen from the foregoing detailed description, there is provided a method and system for increasing the availability of a server cluster while reducing its cost. By requiring a server node to own a quorum of replica members in order to form or continue a cluster, integrity of the cluster data is ensured.

While the invention is susceptible to various modifications and alternative constructions, certain illustrated embodiments thereof are shown in the drawings and has been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method of operating a server cluster of at least one node, comprising:
storing cluster operational data on a plurality of replica members that are each independent of any node; and
at one node:
obtaining control of a replica set of a number of replica members;
comparing the number of replica members in the replica set with a total number of replica members configured to operate in the cluster; and
forming the cluster if the number of replica members in the replica set is a quorum of the total number of replica members.

2. The method of claim 1 wherein a quorum is one more than half of the total number of replica members.

3. The method of claim 1 further comprising, determining which of the replica members of the replica set has the most updated operational data, and replicating that operational data to the other replica members of the replica set.

4. The method of claim 3 wherein determining which of the replica members of the replica set has the most updated operational data includes, maintaining in association with the cluster operational data on each replica member an identifier that identifies a state of the operational data on that replica member.

5. The method of claim 1 wherein storing cluster operational data includes storing information indicative of the total number of replica members configured to operate in the cluster.

6. The method of claim 1 wherein storing cluster operational data includes storing the state of at least one other storage device of the cluster.

7. The method of claim 1 further comprising, determining that at least one replica member of the replica set is no longer operational, and terminating the cluster if the replica members in the replica set remaining operational do not constitute a quorum of the total number of replica members.

8. The method of claim 1 wherein obtaining control of a replica set includes issuing a reserve command for each replica member.

9. The method of claim 1 wherein obtaining control of a replica set includes arbitrating for exclusive ownership of each member of the replica set.

10. The method of claim 9 wherein arbitrating for exclusive ownership includes executing a mutual exclusion algorithm.

11. The method of claim 1 wherein obtaining control of a replica set includes, arbitrating for exclusive ownership of each member of the replica set using a mutual exclusion algorithm, and exclusively reserving each member of the replica set successfully arbitrated for.

12. The method of claim 1 wherein obtaining control of a replica set includes issuing a reset command, delaying for a period of time, and issuing a reserve command.

13. The method of claim 1 wherein obtaining control of a replica set includes issuing a reset command.

14. A computer-readable medium having computer-executable instructions for performing the method of claim 1.

15. A system for providing consistent operational data of a previous server cluster to a new server cluster, comprising, a plurality of nodes, a plurality of replica members, each replica member being independent of any node, at least one replica member having updated cluster operational data stored thereon by a first node including information indicative of a quorum requirement of a number of replica members needed to form a cluster, and a cluster service on a second node configured to 1) obtain control of a replica set of a number of replica members, 2) compare the number of replica members in the replica set with the quorum requirement, and 3) form the new server cluster if the quorum requirement is met by the number of replica members in the replica set.

16. The system of claim 15 wherein the cluster service further determines which of the replica members of the replica set has the most updated data.

17. The system of claim 16 wherein at least some of the most updated operational data is replicated to at least one other replica member of the replica set.

18. The system of claim 15 wherein each of the replica members maintains in association with the cluster operational data an identifier that identifies a state of the cluster operational data, and wherein the cluster service determines which of the replica members of the replica set has the most updated operational data based on the identifier of each replica member.

19. The system of claim 15 wherein the cluster service terminates the cluster if the number of operational replica members falls below the quorum requirement.

20. The system of claim 15 wherein the second node comprises the first node following a cluster shutdown.

21. A method of forming and operating a server cluster, comprising:
storing cluster operational data on a plurality of replica members, each replica member being independent of any node of the cluster;
arbitrating among a plurality of nodes for exclusive control of a replica set of a number of the replica members; and
at a first node having exclusive control of the replica set:
comparing the number of replica members in the replica set with a total number of replica members configured to operate in the cluster;
forming the cluster if the number of replica members in the replica set is a quorum of the total number of replica members; and
after a failure of at least one replica member, continuing to operate the cluster if the replica members in the replica set remaining operational constitute a quorum of the total number of replica members.

22. The method of claim 21 further comprising terminating the cluster if the replica members in the replica set remaining operational do not constitute a quorum of the total number of replica members.

23. The method of claim 21 further comprising challenging for exclusive ownership of the replica set at a second node.

24. The method of claim 23 wherein the second node is not communicating with the cluster.

25. The method of claim 23 wherein challenging for exclusive ownership of the replica set is performed separately by the second node for each replica member of the replica set.

26. The method of claim 23 further comprising defending exclusive ownership of the replica set at the first node.

27. The method of claim 26 wherein the first node separately defends exclusive ownership for each replica member of the replica set.

28. The method of claim 21 further comprising, determining which of the replica members of the replica set has the most updated cluster operational data, and replicating that operational data to the other replica members of the replica set.

29. The method of claim 21 wherein arbitrating among a plurality of nodes for exclusive control of the replica set includes executing a mutual exclusion algorithm on each of the plurality of nodes.

30. The method of claim 29 further comprising, obtaining exclusive control of the replica set by exclusively reserving each of the members.

31. A computer-readable medium having computer-executable instructions for performing the method of claim 21.

32. A method of obtaining representation of a server cluster at a second node that is not presently representing the cluster, comprising:
storing cluster operational data on a plurality of replica members of a replica set, each replica member being independent of any node of the cluster;
representing the cluster at a first node by obtaining exclusive control of a quorum of the replica members;
defending ownership of the cluster at the first node by regularly persisting exclusive ownership of each of the replica members; and
challenging for exclusive ownership of each of the replica members at the second node, such that if the first node fails and is unable to defend ownership of the replica members, the second node reserves exclusive ownership of a quorum of the replica members and thereby represents the cluster.

33. The method of claim 32 wherein a quorum is one more than half of the total number of replica members.

34. The method of claim 32 further comprising, determining which of the replica members of the replica set has the most updated operational data, and replicating that operational data to the other replica members of the replica set.

35. The method of claim 34, wherein determining which of the replica members of the replica set has the most updated operational data includes, maintaining in association with the cluster operational data on each replica member an identifier that identifies a state of the operational data on that replica member.

36. The method of claim 32 wherein storing cluster operational data includes storing information indicative of the total number of replica members configured to operate in the cluster.

37. The method of claim 32 further comprising, determining that at least one replica member of the replica set is no longer operational, and preventing updates to the cluster configuration data if the replica members in the replica set remaining operational do not constitute a quorum of the total number of replica members.

38. The method of claim 32 wherein obtaining control of a replica set includes arbitrating for exclusive ownership of each member of the replica set.

39. The method of claim 38 wherein arbitrating for exclusive ownership includes executing a mutual exclusion algorithm.

40. The method of claim 32 wherein obtaining control of a replica set includes issuing a reset command.

41. The method of claim 32 wherein obtaining control of a replica set includes issuing a reserve command for each replica member.

42. The method of claim 32 wherein defending ownership includes issuing a reserve command for each replica member.

43. The method of claim 32 wherein obtaining control of a replica set includes, arbitrating for exclusive ownership of each member of the replica set using a mutual exclusion algorithm, and exclusively reserving each member of the replica set successfully arbitrated for.

44. The method of claim 32 wherein challenging for exclusive ownership includes issuing a reset command.

45. The method of claim 44 wherein challenging for exclusive ownership further includes, delaying for a period of time following the reset command, and issuing a reserve command.

46. A computer-readable medium having computer-executable instructions for performing the method of claim 32.

47. In a server cluster, a method, comprising:
   storing cluster operational data on a plurality of replica members that are independent of nodes of the server cluster;
   arbitrating at a first node for control of the plurality of replica members;
   determining whether a quorum of replica members is controlled by the first node, and if so, forming a cluster, determining which replica member has the most updated operational data, and replicating the updated operational data to at least one other replica member; and
   while a quorum of the replica members continues to be controlled by the first node, operating the server cluster, defending control of the replica members at the first node, and challenging for control of the replica members at a second node.

48. The method of claim 47 wherein the second node successfully challenges for control of at least some of the replica members, and further comprising, operating the server cluster if the second node controls a quorum of the replica members.

49. The method of claim 47 wherein the second node successfully challenges for control of at least one of the replica members such that the first node no longer controls a quorum of replica members, and further comprising, preventing updates to the cluster operational data until at least one node controls a quorum of the replica members.

* * * * *

UNITED STATES PATENT AND TRADEMARK OFFICE
CERTIFICATE OF CORRECTION

PATENT NO. : 6,401,120 B1
DATED : June 4, 2002
INVENTOR(S) : Gamache et al.

It is certified that error appears in the above-identified patent and that said Letters Patent is hereby corrected as shown below:

Column 2,
Lines 6-7, "to provide highly-reliable single quorum device for storage" should read -- to provide highly-reliable single quorum devices for storage --.
Lines 23-24, "times-tamps" should read -- time-stamps --.

Column 5,
Line 56, "$60_n$) The" should read -- $60_n$). The --.

Column 7,
Line 28, "(e.g." should read -- (e.g., --.

Column 11,
Lines 19-20, "replica set set 106" should read -- replica set 106 --.

Column 14,
Lines 11 and 15, "y value" should read -- y-value --.

Column 16,
Line 26, "that an partial update" should read -- that a partial update --.

Column 18,
Line 2, "step $60_4$" should read -- step 604 --.
Line 55, "made to write to write the" should read -- made to write the --.

Column 19,
Lines 39-40, "joining, formation process" should read -- joining/formation process --.
Lines 47-48, "joining, formation process" should read -- joining/formation process --.
Lines 50-51, "need be maintained in the replica members $58_1$-$58_3$ only the data needed" should read -- need be maintained in the replica members $58_1$-$58_3$; only the data needed --.

UNITED STATES PATENT AND TRADEMARK OFFICE
CERTIFICATE OF CORRECTION

PATENT NO. : 6,401,120 B1
DATED : June 4, 2002
INVENTOR(S) : Gamache et al.

It is certified that error appears in the above-identified patent and that said Letters Patent is hereby corrected as shown below:

Column 20,
Lines 27-29, "certain illustrated embodiments thereof are shown in the drawings and has been described" should read -- certain illustrated embodiments thereof are shown in the drawings and have been described --.

Signed and Sealed this

Eighteenth Day of January, 2005

JON W. DUDAS
*Director of the United States Patent and Trademark Office*